United States Patent
Yoshinari et al.

(10) Patent No.: US 9,870,249 B2
(45) Date of Patent: Jan. 16, 2018

(54) VIRTUAL COMPUTER SYSTEM, METHOD, AND NON-TRANSITORY COMPUTER READABLE MEDIUM

(71) Applicant: FUJI XEROX CO., LTD., Tokyo (JP)

(72) Inventors: Toshiaki Yoshinari, Kanagawa (JP); Koji Nishiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 14 days.

(21) Appl. No.: 15/003,215

(22) Filed: Jan. 21, 2016

(65) Prior Publication Data

US 2017/0060614 A1 Mar. 2, 2017

(30) Foreign Application Priority Data

Aug. 28, 2015 (JP) .................................. 2015-168955

(51) Int. Cl.
| | |
|---|---|
| G06F 9/455 | (2006.01) |
| G06F 11/07 | (2006.01) |
| G06F 11/14 | (2006.01) |
| G06K 15/02 | (2006.01) |

(52) U.S. Cl.
CPC ...... *G06F 9/45558* (2013.01); *G06F 11/0712* (2013.01); *G06F 11/0733* (2013.01); *G06F 11/0778* (2013.01); *G06F 11/1484* (2013.01); *G06K 15/02* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

2013/0111275 A1\* 5/2013 Ganesan ............. G06F 11/0748
714/49
2014/0089264 A1\* 3/2014 Talagala .............. G06F 11/1471
707/649

FOREIGN PATENT DOCUMENTS

| JP | 2014-032498 A | 2/2014 |
|---|---|---|
| JP | 5713138 B1 | 5/2015 |

\* cited by examiner

*Primary Examiner* — Dong Kim
(74) *Attorney, Agent, or Firm* — Oliff PLC

(57) ABSTRACT

A virtual computer system includes an external event acquisition controller, an external event storing unit, and a snap shot creating unit. The external event acquisition controller performs control for acquiring an event regarding an external device provided outside a virtual computer which mounts a guest operating system in which an application program is installed. The external event storing unit stores the external event acquired by the external event acquisition controller. The snap shot creating unit creates a snap shot of the guest operating system including the application program after the external event is stored in the external event storing unit.

7 Claims, 27 Drawing Sheets

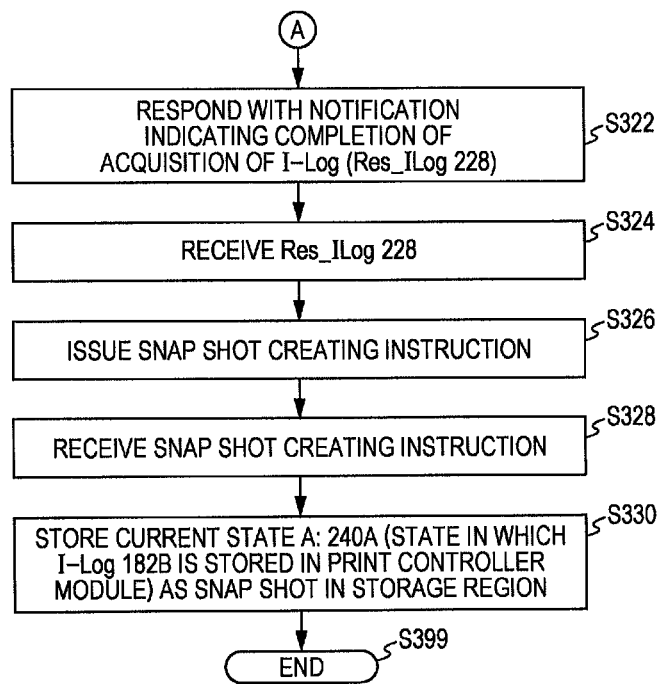
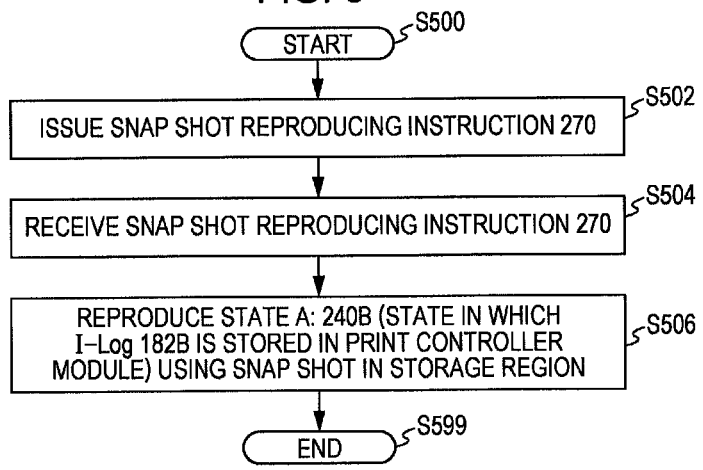

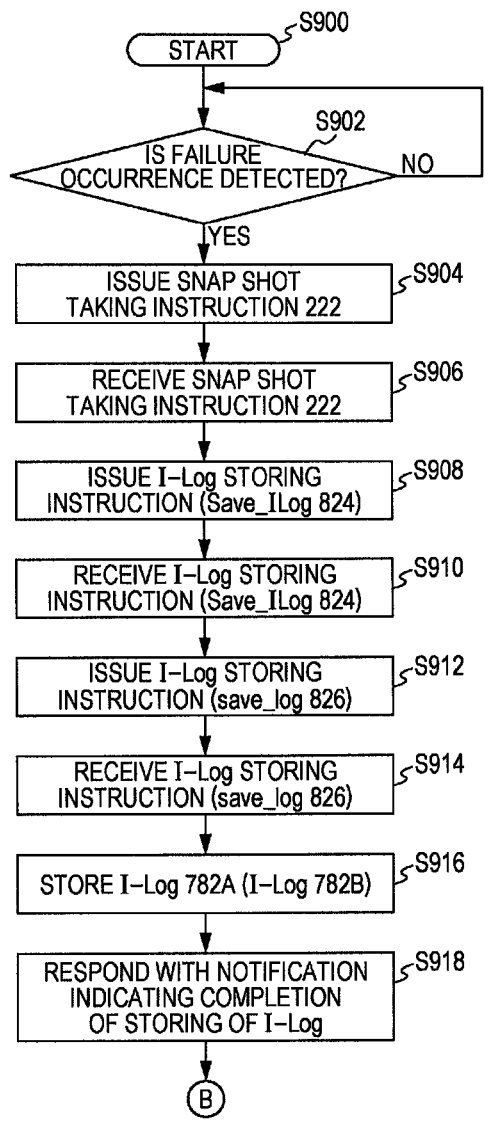

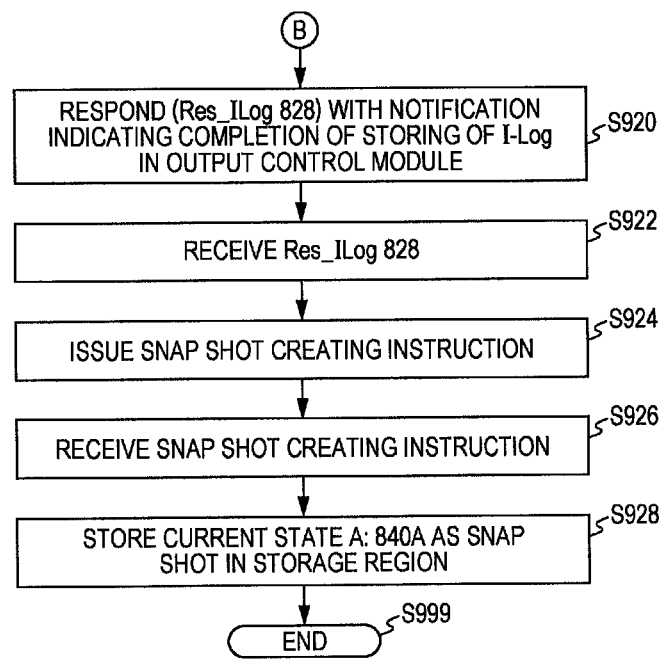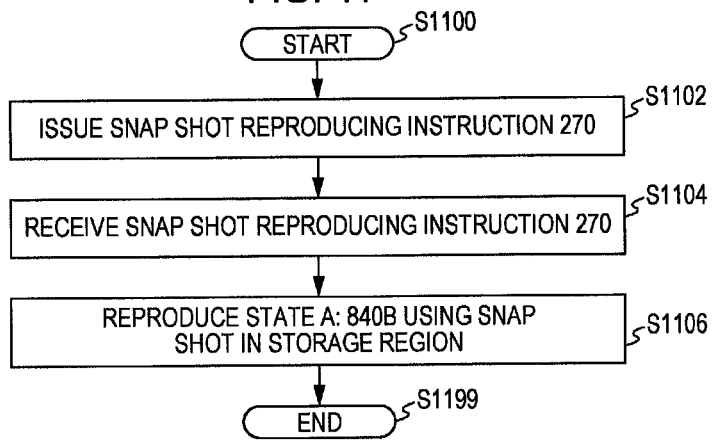

VIRTUAL COMPUTER SYSTEM, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-168955 filed Aug. 28, 2015.

BACKGROUND

Technical Field

The present invention relates to a virtual computer system, a method, and a non-transitory computer readable medium.

SUMMARY

According to an aspect of the invention, there is provided a virtual computer system including an external event acquisition controller, an external event storing unit, and a snap shot creating unit. The external event acquisition controller performs control for acquiring an event regarding an external device provided outside a virtual computer which mounts a guest operating system in which an application program is installed. The external event storing unit stores the external event acquired by the external event acquisition controller. The snap shot creating unit creates a snap shot of the guest operating system including the application program after the external event is stored in the external event storing unit.

BRIEF DESCRIPTION OF THE DRAWINGS

Exemplary embodiments of the present invention will be described in detail based on the following figures, wherein:

FIG. 4 is a flowchart illustrating a processing example according to the first exemplary embodiment;

FIG. 5 is a flowchart illustrating a processing example according to the first exemplary embodiment;

FIG. 9 is a flowchart illustrating a processing example according to the second exemplary embodiment;

FIG. 10 is a flowchart illustrating a processing example according to the second exemplary embodiment;

FIG. 11 is a flowchart illustrating a processing example according to the second exemplary embodiment;

DETAILED DESCRIPTION

First, before explanation of exemplary embodiments will be provided, technologies of related arts will be explained with reference to examples illustrated in FIGS. 14 to 17. The explanation below will be provided to achieve easier understanding of the exemplary embodiments. An example of a printer as an external device will be explained.

Figure 14:
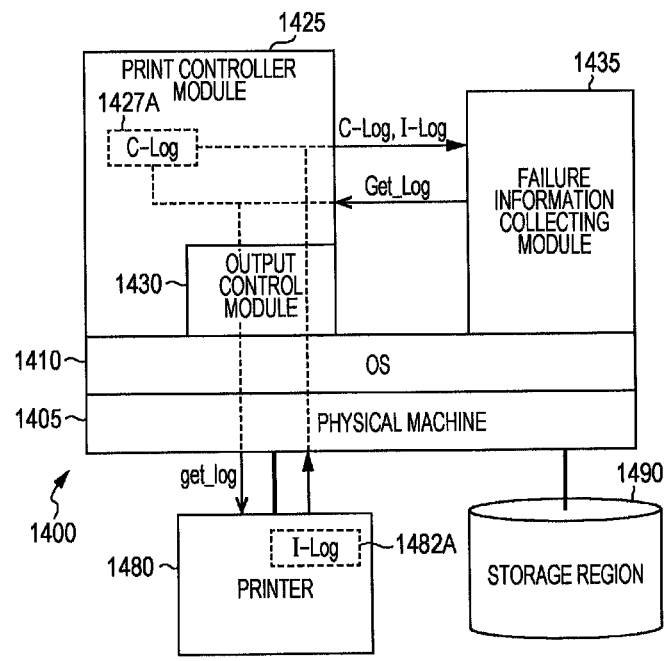
FIG. 14 is an explanatory diagram illustrating an example of a related art.

FIG. 14 is an explanatory diagram illustrating an example of a related art. An information processing device 1400 controls a printer 1480, which is an external device, to perform printing processing. The information processing device 1400 is a general computer (a computer in which a single operating system (OS) 1410 is provided for a single physical machine 1405), which is not a virtual computer system. For example, the information processing device 1400 functions as a printer server or a printer controller, and the printer 1480 is a high-speed printer.

The information processing device 1400 includes the physical machine 1405 and the OS 1410 in that order from the bottom layer. A print controller module 1425 and a failure information collecting module 1435, which are application programs, are provided on the OS 1410. The print controller module 1425 includes an output control module 1430, and stores a C-Log 1427A. The output control module 1430 is a program for controlling the printer 1480. The printer 1480 stores an I-Log 1482A.

When a failure occurs in the information processing device 1400 or the printer 1480, the print controller module

1425 collects log information (C-Log 1427A) of inside thereof and the OS 1410, in accordance with an instruction (Get_Log) from the failure information collecting module 1435. The failure may be caused by the printer 1480, which is outside the control of the print controller module 1425. Therefore, the print controller module 1425 also collects log information (I-Log 1482A) of the printer 1480 through the output control module 1430 inside thereof (in accordance with a get_log instruction from the output control module 1430 to the printer 1480), and transmits the C-Log 1427A and the I-Log 1482A to the failure information collecting module 1435. Then, the failure information collecting module 1435 stores the C-Log 1427A and the I-Log 1482A in a storage region 1490.

Figure 15:
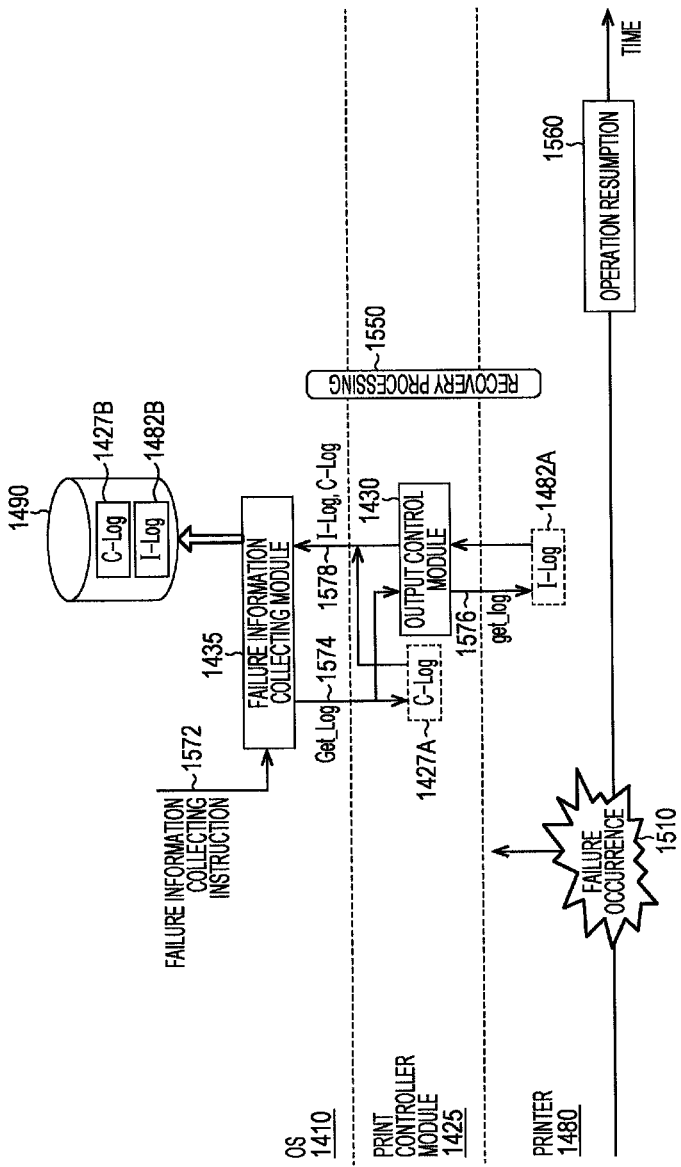
FIG. 15 is an explanatory diagram illustrating a processing example according to a related art.

FIG. 15 is an explanatory diagram illustrating a processing example of a related art.

The information processing device 1400 operates to cause the printer 1480 to perform printing processing, and it is assumed that failure occurrence 1510 happens during the operation.

When the failure occurrence 1510 is detected, a failure information collecting instruction 1572 is issued to the failure information collecting module 1435 on the OS 1410. The failure information collecting module 1435 issues a Get_Log 1574 instruction to the print controller module 1425, and acquires the state (log information) of inside the print controller module 1425 and the OS 1410 at that time as the C-Log 1427A. Then, the print controller module 1425 controls the output control module 1430, and the output control module 1430 issues a get_log 1576 instruction to the printer 1480 under the control by the print controller module 1425, and acquires the I-Log 1482A, which is the state (log information) of the printer 1480 at that time from the printer 1480. Then, the output control module 1430 transmits an I-log and a C-Log 1578 (C-Log 1427A and I-Log 1482A) as a response to the Get_Log 1574 to the failure information collecting module 1435. The failure information collecting module 1435 stores the I-log and the C-Log 1578 as the C-Log 1427B and the I-Log 1482B in the storage region 1490. After that, failure recovery processing 1550 is performed, and operation resumption 1560 is achieved.

After this processing, when the operation of the printer 1480 is completed, by analyzing the C-Log 1427B and the I-Log 1482B, a cause of the failure, countermeasures against the failure, and the like are considered. After the logs are collected, in order to continue printing processing at the printer 1480, the recovery processing 1550 and the operation resumption 1560 are performed without the logs being analyzed. In particular, in the case where the printer 1480 is a high-speed printer, there is a demand for shortening the down period (period during which printing may not be performed).

Figure 16:
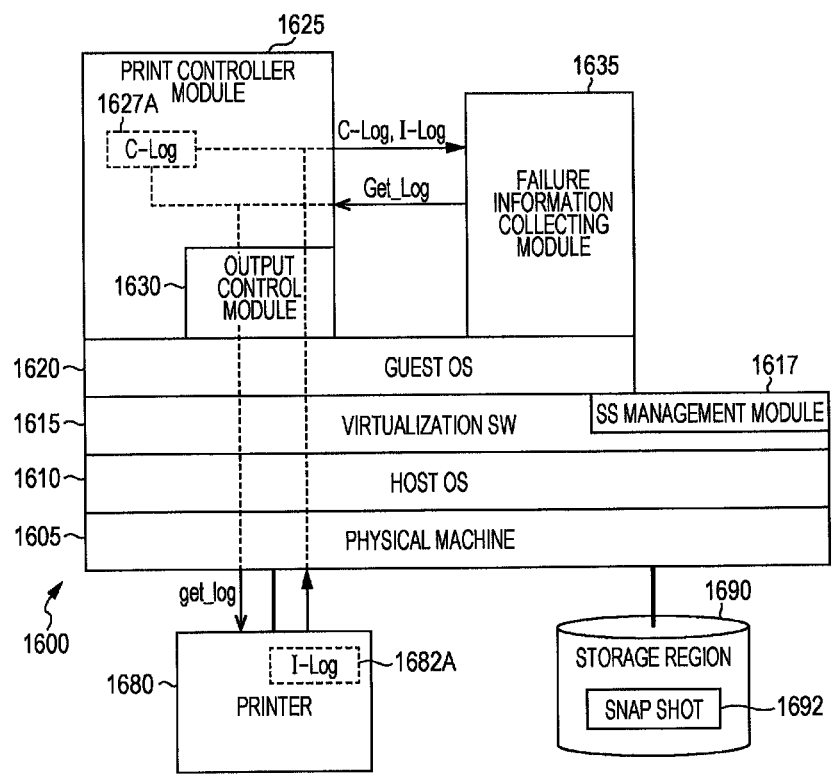
FIG. 16 is an explanatory diagram illustrating an example of a related art.

Next, an example of a virtual computer system will be explained. FIG. 16 is an explanatory diagram illustrating an example of a related art. An information processing device 1600 is a virtual computer system, and controls a printer 1680, which is an external device, to perform printing processing. For example, the information processing device 1600 functions as a printer server, and the printer 1680 is a high-speed printer.

A technique called a virtualization system is a technique for causing multiple guest OSs 1620 to operate on a single physical machine 1605 (hardware). As illustrated in the example of FIG. 16, virtual hardware is established by a host OS 1610 and virtualization software (SW) 1615 on the physical machine 1605. The guest OS 1620 is installed on the virtual hardware, and a print controller module 1625, which is an application program (application), is installed on the guest OS 1620.

The virtualization SW 1615 is software which allows the multiple guest OSs 1620 to coexist in parallel on the physical machine 1605. That is, the virtualization SW 1615 establishes hardware such as a central processing unit (CPU), a memory, and a hard disk drive (HDD) in a software manner and prepares a hardware resource on which the guest OSs 1620 depend as a virtual machine.

For example, a printer control program (a specific example includes a digital front end (DFE)) is used as the print controller module 1625. In this case, virtual machines are separated from one other, and even if a failure (for example, crash etc.) occurs in any of the virtual machines, a printer control program on a different virtual machine continues to operate and is therefore able to perform printing.

Specifically, the information processing device 1600 includes the physical machine 1605, the host OS 1610, the virtualization SW 1615, and the guest OS 1620 in that order from the bottom layer. The print controller module 1625 and a failure information collecting module 1635, which are application programs, are provided on the guest OS 1620. The virtualization SW 1615 includes an SS management module 1617. The print controller module 1625 includes an output control module 1630 and stores a C-Log 1627A. The printer 1680 stores an I-Log 1682A. A storage region 1690 stores a snap shot 1692. FIG. 16 illustrates an example in which a single guest OS 1620 is arranged on the virtualization SW 1615. However, since the information processing device 1600 is a virtual computer system, multiple guest OSs 1620 may be arranged on the virtualization SW 1615.

In the information processing device 1600, the print controller module 1625, which is an application program, is caused to operate under a virtualization environment, a failure state at the time of occurrence of a failure is held as a snap shot 1692 in the storage region 1690 by using a snap shot function (function of the SS management module 1617) under the virtualization environment. Then, the failure is recovered, and after predetermined printing processing is completed (at a time in which no printing service is being performed), the state at the time of occurrence of the failure is reproduced using the stored snap shot 1692, and then failure information is acquired. The creation and reproduction of the snap shot of the guest OS 1620 on which the print controller module 1625 operates is performed by the SS management module 1617.

Figure 17:
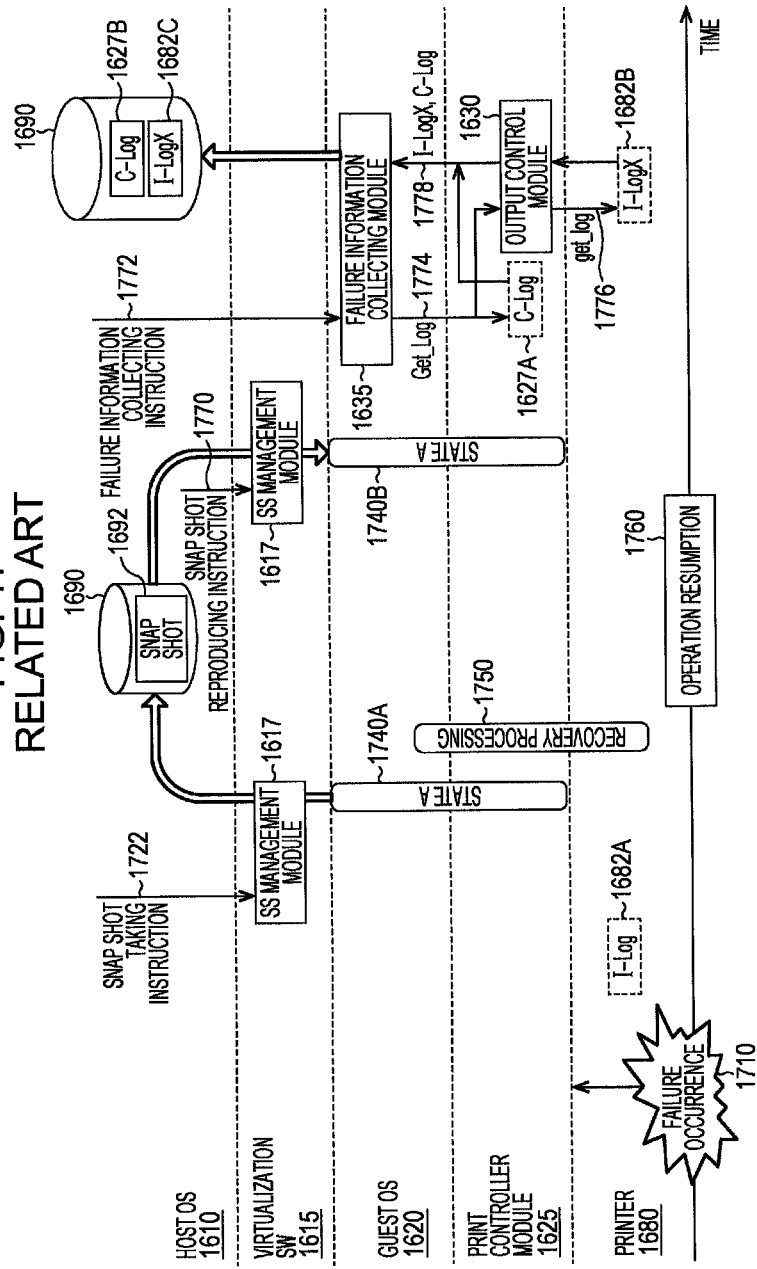
FIG. 17 is an explanatory diagram illustrating a processing example according to a related art.

Referring to an example illustrated in FIG. 17, the information processing device 1600 operates to cause the printer 1680 to perform printing processing, and it is assumed that failure occurrence 1710 happens during the operation.

When the failure occurrence 1710 is detected, a snap shot taking instruction 1722 is issued to the SS management module 1617 in accordance with a user operation through the host OS 1610. By monitoring the status inside the print controller module 1625, the snap shot taking instruction 1722 may be issued automatically. The SS management module 1617 stores a state A: 1740A of the guest OS 1620 and the print controller module 1625 at that time as the snap shot 1692 in the storage region 1690. At the printer 1680, the I-Log 1682A is generated as log information by the failure occurrence 1710. However, since the snap shot of the SS management module 1617 is acquired by obtaining the state inside the information processing device 1600, the I-Log 1682A of the printer 1680, which is an external device, is not a target of the snap shot.

After that, failure recovery processing 1750 is performed, and operation resumption 1760 is achieved.

Then, after the operation of the printer 1680 is completed, a snap shot reproducing instruction 1770 is issued to the SS management module 1617 in accordance with a user operation through the host OS 1610. The SS management module 1617 reads the snap shot 1692 within the storage region 1690, and returns the state of the guest OS 1620 and the print controller module 1625 to a state A: 1740B (the same as the state A: 1740A). Then, a failure information collecting instruction 1772 is issued to the failure information collecting module 1635 in accordance with a user operation through the host OS 1610, and processing similar to that illustrated in the example of FIG. 15 is performed. That is, the failure information collecting module 1635 issues a Get_Log 1774 instruction to the print controller module 1625, and acquires the state (log information) of inside the print controller module 1625 and the guest OS 1620 at that time as the C-Log 1627A. Then, the print controller module 1625 controls the output control module 1630, and the output control module 1630 issues a get_log 1776 instruction to the printer 1680 under the control by the print controller module 1625, and acquires an I-LogX 1682B, which is the state (log information) of the printer 1680 at that time from the printer 1680. Then, the output control module 1630 transmits an I-LogX and a C-Log 1778 (C-Log 1627A and I-LogX 1682B) as a response to the Get_Log 1774 to the failure information collecting module 1635. The failure information collecting module 1635 stores the I-LogX and the C-Log 1778 as the C-Log 1927B and an I-LogX 1682C in the storage region 1690.

In the case where log information (I-LogX 1682B) of the printer 1680, which is outside the control of the print controller module 1625, is collected using the failure information collecting module 1635, printing processing (operation resumption 1760) is performed during the time between the failure occurrence 1710 and the failure information collecting instruction 1772, as illustrated in the example of FIG. 17. Therefore, information of the printing processing after the occurrence of the failure (printing processing after the operation resumption 1760) is written in the I-LogX 1682B, which is log information of the printer 1680 at the time of the failure information collecting instruction 1772, and the contents of the I-LogX 1682B are different from those of the I-Log 1682A, which is log information of the printer 1680 at the time of occurrence of the failure. Thus, depending on the printing processing after the operation resumption 1760 of the printer 1680, a situation in which the I-Log 1682A, which is log information at the time of occurrence of the failure, has disappeared (overwritten) may occur. That is, the I-Log 1682A at the time of the failure occurrence 1710 is not stored in the storage region 1690 in accordance with the failure information collecting instruction 1772.

Figure 1:
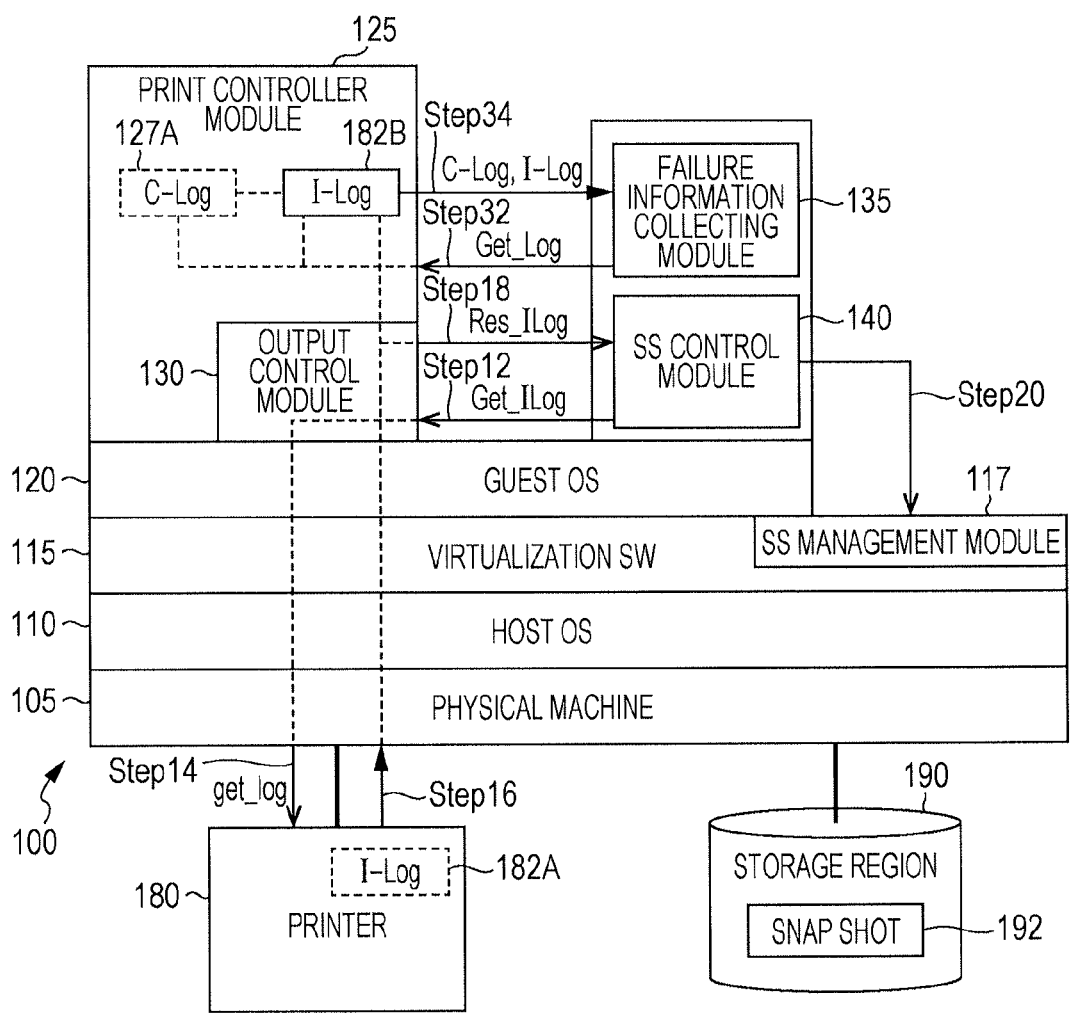
FIG. 1 is a conceptual module configuration diagram of a configuration example according to a first exemplary embodiment.

Hereinafter, various exemplary embodiments of the present invention will be described with reference to drawings.
First Exemplary Embodiment
FIG. 1 illustrates a conceptual module configuration diagram of a configuration example according to a first exemplary embodiment.

In general, the term "module" refers to a component such as software (a computer program), hardware, or the like, which may be logically separated. Therefore, a module in an exemplary embodiment refers not only to a module in a computer program but also to a module in a hardware configuration. Accordingly, through an exemplary embodiment, a computer program for causing the component to function as a module (a program for causing a computer to perform each step, a program for causing a computer to function as each unit, and a program for causing a computer to perform each function), a system, and a method are described. However, for convenience of description, the terms "store", "cause something to store", and other equivalent expressions will be used. When an exemplary embodiment relates to a computer program, the terms and expressions represent "causing a storage device to store", or "controlling a storage device to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, hereinafter, the term "connection" may refer to logical connection (such as data transfer, instruction, and cross-reference relationship between data) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required.

Moreover, a "system" or a "device" may be implemented not only by multiple computers, hardware, devices, or the like connected through a communication unit such as a network (including a one-to-one communication connection), but also by a single computer, hardware, device, or the like. The terms "device" and "system" are used as synonymous terms. Obviously, the term "system" does not include social "mechanisms" (social system), which are only artificially arranged.

Furthermore, for each process in a module or for individual processes in a module performing plural processes, target information is read from a storage device and a processing result is written to the storage device after the process is performed. Therefore, the description of reading from the storage device before the process is performed or the description of writing to the storage device after the process is performed may be omitted. The storage device may be a hard disk, a random access memory (RAM), an external storage medium, a storage device using a communication line, a register within a CPU, or the like.

An information processing device 100, which is a virtual computer system, according to the first exemplary embodiment stores the state of a print controller module 125 and a printer 180, which is an external device, immediately after a failure occurs, as a snap shot, so that the state may be reproduced. As illustrated in the example of FIG. 1, the information processing device 100 includes a physical machine 105, a host OS 110, a virtualization SW 115, and a guest OS 120 in that order from the bottom layer. The print controller module 125, a failure information collecting module 135, and an SS control module 140, which are application programs, are provided on the guest OS 120. The virtualization SW 115 includes an SS management module 117. That is, the SS management module 117 is a module which is normally incorporated into the virtualization SW 115. The print controller module 125 includes an output control module 130 and stores a C-Log 127A and an I-Log 182B. The printer 180 stores an I-Log 182A. A storage region 190 stores a snap shot 192.

Although the printer 180 is illustrated as an example of an external device, the external device may be a different device (for example, a scanner). That is, the external device may be any device which is controlled by a virtual computer system and for which recovery processing is performed before a failure is analyzed. An application program may be, for example, a printer control program. Hereinafter, an example of a printer control program will be explained.

As illustrated in the example of FIG. 1, the SS control module 140, which instructs to collect log information (I-Log 182A) of the printer 180 and create a snap shot of the guest OS 120 on which the print controller module 125 operates (may include reproduction of a snap shot) by using the SS management module 117, is introduced to the information processing device 100, which is a virtual computer. The failure information collecting module 135 collects log information (C-Log) of inside the print controller module 125 and the guest OS 120 and acquires log information (I-Log 182B) of the printer 180, which has already been collected.

That is, the SS control module 140 performs control for acquiring an event regarding the printer 180, which is provided outside the information processing device 100, which is a virtual computer mounting the guest OS 120 to which the print controller module 125, which is an application program, has been installed. A specific example of an "event regarding the printer 180" includes the I-Log 182A, which is log information of the printer 180 at the time of occurrence of a failure. A failure may occur in the information processing device 100 or in the printer 180.

The print controller module 125 stores an external event acquired by the SS control module 140. That is, the I-Log 182B (the same as contents as the I-Log 182A in the printer 180) is stored in the print controller module 125. Obviously, the print controller module 125 is located within the information processing device 100 (within a region as a target of a snap shot by the SS management module 117), and therefore the print controller module 125 also stores the C-Log 127A, which is log information of the guest OS 120 and the print controller module 125.

After the I-Log 182A, which is an external event, is stored in the print controller module 125, the SS management module 117 creates a snap shot of the guest OS 120 which includes the print controller module 125. Therefore, the snap shot includes the I-Log 182B as well as the C-Log 127A. Specifically, after receiving notification indicating that storing of an event is completed from the SS control module 140, the SS management module 117 creates a snap shot.

Specifically, when a failure occurs, the SS control module 140 issues an instruction (Get_ILog) for acquiring the I-Log 182A of the printer 180 to the print controller module 125 (Step 12). Under the control by the print controller module 125, the output control module 130 issues an instruction (get_log) for acquiring the I-Log 182A to the printer 180 (Step 14). The printer 180 delivers the I-Log 182A to the output control module 130 (Step 16). As a result, the I-Log 182B is stored in the print controller module 125. Then, the print controller module 125 (output control module 130) performs Res_ILog processing indicating that processing of Get_ILog is completed (Step 18). The SS control module 140 instructs the SS management module 117 to perform snap shot processing (Step 20). As a result, the snap shot 192 is stored in the storage region 190. The snap shot 192 includes the C-Log 127A and the I-Log 182B within the print controller module 125.

Then, failure recovery processing is performed, and the operation is resumed. In the case where collection and analysis of the failure is performed after the operation is completed, the SS management module 117 restores the state at the time of occurrence of the failure by using the snap shot 192 in the storage region 190. As a result, the I-Log 182B (the I-Log 182A within the printer 180 at the time of occurrence of the failure) as well as the C-Log 127A at the time of occurrence of the failure is restored in the print controller module 125. The failure information collecting module 135 issues an instruction (Get_Log) for acquiring failure information to the print controller module 125 (Step 32). The print controller module 125 transmits the C-Log 127A and the I-Log 182B to the failure information collecting module 135 (Step 34). A person in charge analyzes the C-Log 127A and the I-Log 182B acquired by the failure information collecting module 135, and considers a cause of the failure, countermeasures against the failure, and the like.

The information processing device 100 performs, as an overview, the processing described below.

In the case where the print controller module 125 is caused to operate on the guest OS 120 and failure information is collected using a snap shot function of the virtual computer system, as described above, the time of occurrence of a failure greatly differs from the time of acquisition of failure information. Therefore, at the time of acquisition of failure information, an external device such as the printer 180, which is not a snap shot target, may not hold log information at the time of occurrence of a failure. Thus, a known failure information collecting function is distributed between the SS control module 140 and the failure information collecting module 135, and the SS control module 140 takes the log information of the printer 180 at the time of occurrence of the failure into the print controller module 125 before a snap shot is taken.

Accordingly, by creating a snap shot for which it takes a short time to complete processing immediately after the occurrence of the failure, the original printing processing may be resumed immediately after the failure recovery processing without performing an operation for collecting failure information, which takes a long time. Then, by reproducing the snap shot at a desired timing such as a time immediately after a printing service is completed, failure information immediately after the occurrence of the failure (failure information of an external device such as the printer 180 as well as the print controller module 125) may be acquired.

That is, a user of the printer 180 does not need to collect failure information in accordance with the occurrence of a failure. As a result, the operating ratio of the printer 180 may be increased.

Figure 2:
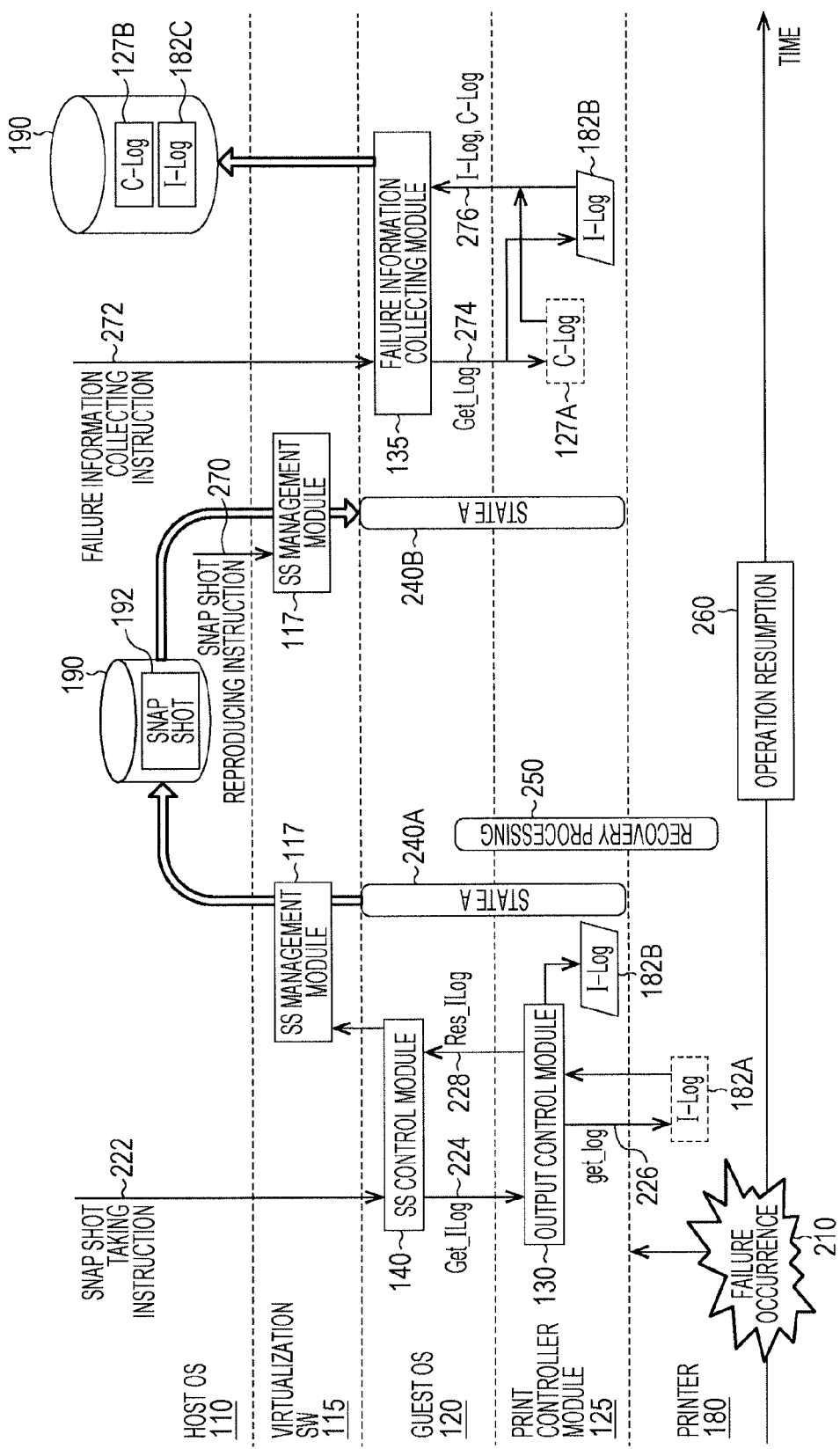
FIG. 2 is an explanatory diagram illustrating a processing example according to the first exemplary embodiment.

FIG. 2 is an explanatory diagram illustrating a processing example according to a first exemplary embodiment.

The information processing device 100 operates to cause the printer 180 to perform printing processing, and it is assumed that failure occurrence 210 happens during the operation.

When the failure occurrence 210 is detected, a snap shot taking instruction 222 is issued to the SS control module 140 on the guest OS 120. The SS control module 140 issues a Get_ILog 224 instruction to the print controller module 125. Under the control by the print controller module 125, the output control module 130 issues a get_log 226 instruction to the printer 180, acquires the I-Log 182A, and stores the acquired I-Log 182A as the I-Log 182B in the print controller module 125. The print controller module 125 (output control module 130) confirms that the I-Log 182B is stored, and transmits a Res_ILog 228 indicating completion of the acquisition to the SS control module 140. Then, the SS control module 140 which has received the Res_ILog 228 requests the SS management module 117 within the virtualization SW 115 for snap shot processing. The SS management module 117 stores a state A: 240A of the guest OS 120 and the print controller module 125 (the I-Log 182B is stored in the print controller module 125) as the snap shot 192 in the storage region 190. After that, recovery processing 250, which is failure recovery, is performed, and operation resumption 260 is achieved.

After predetermined printing processing is completed (or at a time in which no printing service is being performed), the SS management module 117 receives a snap shot reproducing instruction 270 in accordance with a user operation, and reproduce a state A: 240B (state A: 240A) at the time of occurrence of the failure by using the snap shot 192 in the storage region 190. Then, in accordance with a failure information collecting instruction 272, the failure information collecting module 135 acquires the C-Log 127A, which is log information of inside the print controller module 125 and the guest OS 120, and the I-Log 182B, which is log information of the printer 180 that has already been collected, from the print controller module 125, based on a Get_Log 274 instruction to the print controller module 125 (I-Log, C-Log 276). Then, a C-Log 127B (C-Log 127A) and an I-Log 182C (I-Log 182B and I-Log 182A) are stored in the storage region 190. By analyzing the C-Log 127B and the I-Log 182C, a cause of the failure, countermeasures against the failure, and the like are considered. After the failure occurs, in order to continue printing processing at the printer 180, the recovery processing 250 and the operation resumption 260 are performed without logs being collected and analyzed. In particular, in the case where the printer 180 is a high-speed printer, there is a demand for shortening the down period (period during which printing may not be performed).

Figure 3:
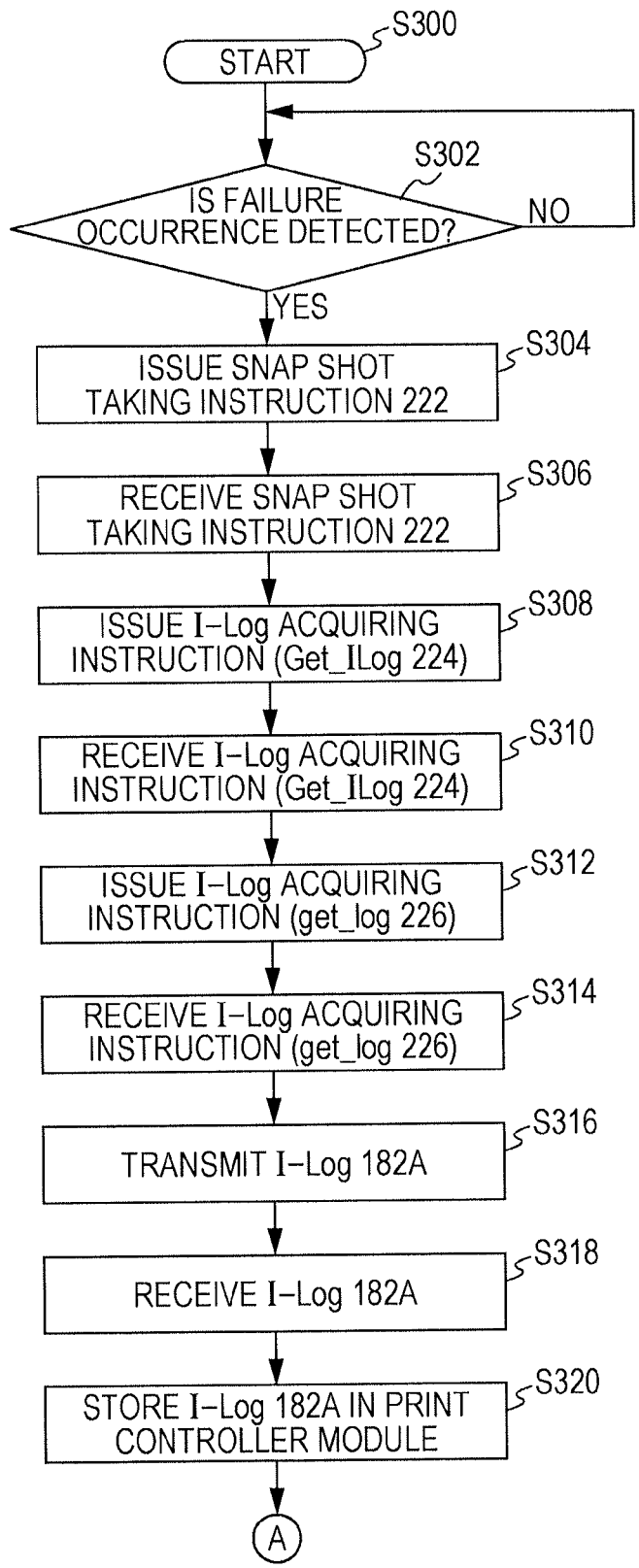
FIG. 3 is a flowchart illustrating a processing example according to the first exemplary embodiment.

FIGS. 3 and 4 are flowcharts illustrating processing examples (processing examples of generating the snap shot 192) according to the first exemplary embodiment.

In step S302, it is determined whether or not failure occurrence is detected. When failure occurrence is detected, the process proceeds to step S304. When failure occurrence is not detected, the process waits until failure occurrence is detected.

In step S304, the snap shot taking instruction 222 is issued in accordance with a user operation. As described above, by monitoring the status inside the print controller module 125, a taking instruction may be issued automatically.

In step S306, the SS control module 140 receives the snap shot taking instruction 222.

In step S308, the SS control module 140 issues an I-Log acquiring instruction (Get_ILog 224).

In step S310, the output control module 130 receives the I-Log acquiring instruction (Get_ILog 224).

In step S312, the output control module 130 issues an I-Log acquiring instruction (get_log 226)

In step S314, the printer 180 receives the I-Log acquiring instruction (get_log 226)

In step S316, the printer 180 transmits the I-Log 182A.

In step S318, the output control module 130 receives the I-Log 182A.

In step S320, the output control module 130 stores the I-Log 182A in the print controller module 125.

In step S322, the output control module 130 responds with a notification indicating that acquisition of the I-Log is completed (Res_ILog 228).

In step S324, the SS control module 140 receives the Res_ILog 228.

In step S326, the SS control module 140 issues a snap shot creating instruction.

In step S328, the SS management module 117 receives the snap shot creating instruction.

In step S330, the SS management module 117 stores the current state A: 240A (the state in which the I-Log 182B is stored in the print controller module 125) as the snap shot 192 in the storage region 190.

FIG. 5 is a flowchart illustrating a processing example (processing example of reproducing the snap shot 192) according to the first exemplary embodiment.

In step S502, in accordance with a user operation, the snap shot reproducing instruction 270 is issued.

In step S504, the SS management module 117 receives the snap shot reproducing instruction 270.

In step S506, the SS management module 117 reproduces the state A: 240B (the state in which the I-Log 182B is stored in the print controller module 125) by using the snap shot 192 in the storage region 190.

Figure 6:
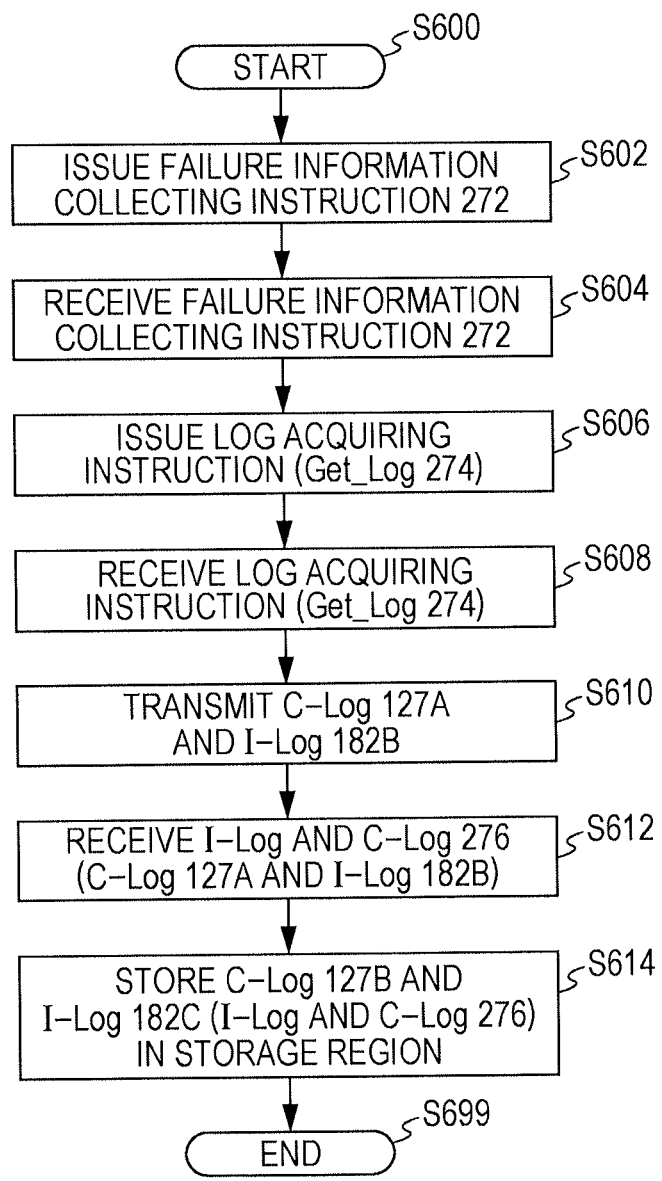
FIG. 6 is a flowchart illustrating a processing example according to the first exemplary embodiment.

FIG. 6 is a flowchart illustrating a processing example (processing example of collecting the C-Log 127A and the I-Log 182B, which are failure information) according to the first exemplary embodiment.

In step S602, in accordance with a user operation, the failure information collecting instruction 272 is issued.

In step S604, the failure information collecting module 135 receives the failure information collecting instruction 272.

In step S606, the failure information collecting module 135 issues a log acquiring instruction (Get_Log 274).

In step S608, the print controller module 125 receives the log acquiring instruction (Get_Log 274).

In step S610, the print controller module 125 transmits the C-Log 127A and the I-Log 182B.

In step S612, the failure information collecting module 135 receives the I-Log and the C-Log 276 (C-Log 127A and I-Log 182B).

In step S614, the failure information collecting module 135 stores the C-Log 127B and the I-Log 182C (I-Log and C-Log 276) in the storage region 190.

Second Exemplary Embodiment

Figure 7:
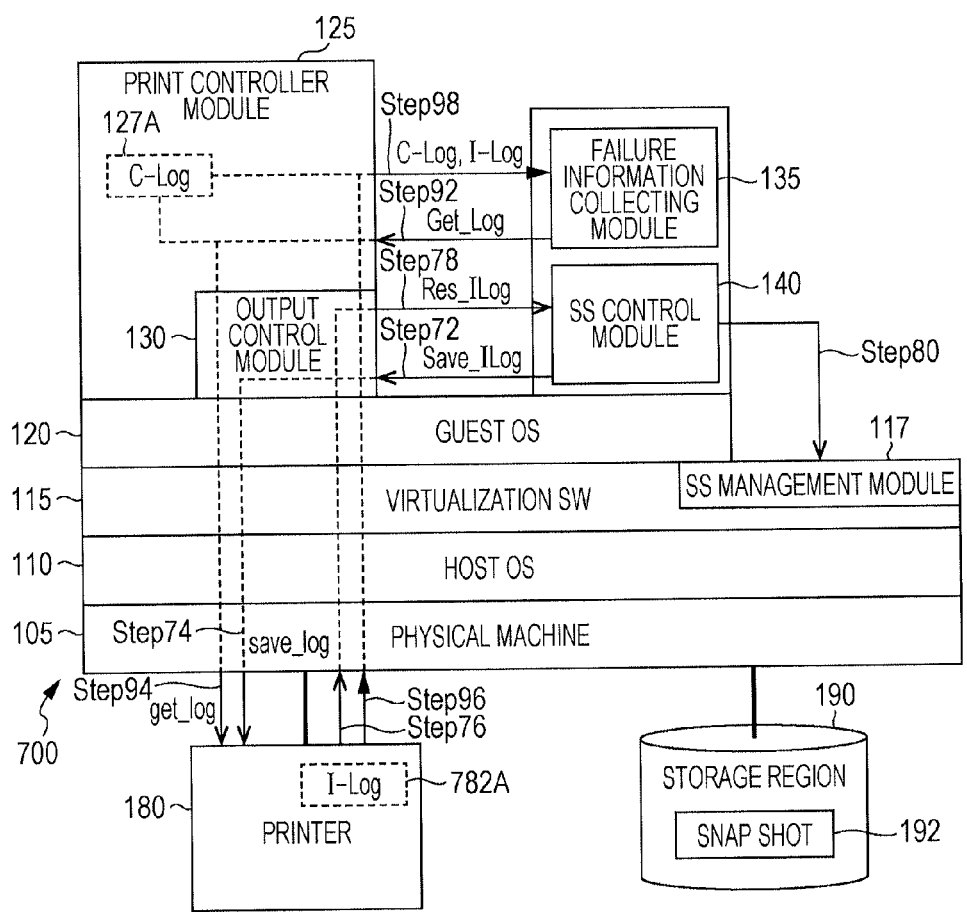
FIG. 7 is a conceptual module configuration diagram of a configuration example according to a second exemplary embodiment.

FIG. 7 is a conceptual module configuration diagram of a configuration example according to a second exemplary embodiment.

An information processing device 700 includes the physical machine 105, the host OS 110, the virtualization SW 115, and the guest OS 120 in that order from the bottom layer, and the print controller module 125, the failure information collecting module 135, and the SS control module 140 are provided on the guest OS 120. The virtualization SW 115 includes the SS management module 117, the print controller module 125 includes the output control module 130 and stores the C-Log 127A. The printer 180 stores an I-Log 782A. The storage region 190 stores the snap shot 192. Parts similar to those in the first exemplary embodiment described above are referred to with the same reference signs and redundant explanation will be omitted (the same applies to the other exemplary embodiments).

As illustrated in the example of FIG. 7, the SS control module 140, which issues a holding instruction (save_log) for log information (I-Log 782A) of the printer 180, and instructs the information processing device 700 to create a snap shot of the guest OS 120 on which the print controller module 125 operates (may include reproduction of a snap shot) by using the SS management module 117, is introduced to the information processing device 700, which is a virtual computer. The failure information collecting module 135 collects log information (C-Log 127A) of inside the print controller module 125 and the guest OS 120 and acquires log information (I-Log 782A) stored in the printer 180.

That is, the SS control module 140 performs control for holding the I-Log 782A for the printer 180 (log information of the printer 180), which is provided outside the information processing device 700, which is a virtual computer mounting the guest OS 120 to which the print controller module 125, which is an application program, has been installed.

The printer 180 stores an external event acquired in accordance with an instruction from the SS control module 140. That is, the I-Log 782A is stored in the printer 180. Obviously, a unit which stores the I-Log 782A is provided inside the printer 180. Furthermore, after the I-Log 782A is stored, new log information is not overwritten on the I-Log 782A by resumption processing of the printer 180, and the I-Log 782A that indicates the state at the time of occurrence of the failure is stored.

After the I-Log 782A, which is an external event, is stored in the printer 180, the SS management module 117 creates a snap shot of the guest OS 120 including the print controller module 125. Thus, by the time of creation of the snap shot, the I-Log 782A has already been stored in the printer 180.

Specifically, when a failure occurs, the SS control module 140 issues an instruction (Save_ILog) for storing the I-Log 782A of the printer 180 to the print controller module 125 (Step 72). Under the control by the print controller module 125, the output control module 130 issues an instruction (save_log) for storing the I-Log 782A to the printer 180 (Step 74). The printer 180 stores the I-Log 782A, and sends to the output control module 130 a notification indicating that storing is completed (Step 76). Then, the print controller module 125 (output control module 130) performs Res_ILog processing indicating that processing of the Save_Log is completed (Step 78). The SS control module 140 instructs the SS management module 117 to perform snap shot processing (Step 80). As a result, the snap shot 192 is stored in the storage region 190. The C-Log 127A within the print controller module 125 is stored in the snap shot 192.

Then, failure recovery processing is performed, and the operation is resumed. In the case where collection and analysis of the failure is performed after the operation is completed, the SS management module 117 restores the state at the time of the failure by using the snap shot 192 within the storage region 190. As a result, the C-Log 127A at the time of occurrence of the failure is restored in the print controller module 125. The failure information collecting module 135 issues an instruction (Get_Log) for acquiring the state at the time of the failure to the print controller module 125 (Step 92). Under the control by the print controller module 125, the output control module 130 issues an instruction (get_log) for acquiring the I-Log 782A from the printer 180 (Step 94). The printer 180 performs processing for transmitting the I-Log 782A to the output control module 130 (Step 96). The print controller module 125 transmits the I-Log 782A, which is acquired by the output control module 130, and the C-Log 127A to the failure information collecting module 135 (Step 98). A person in charge analyzes the C-Log 127A and the I-Log 782A acquired by the failure information collecting module 135 and considers a cause of the failure, countermeasures against the failure, and the like.

Figure 8:
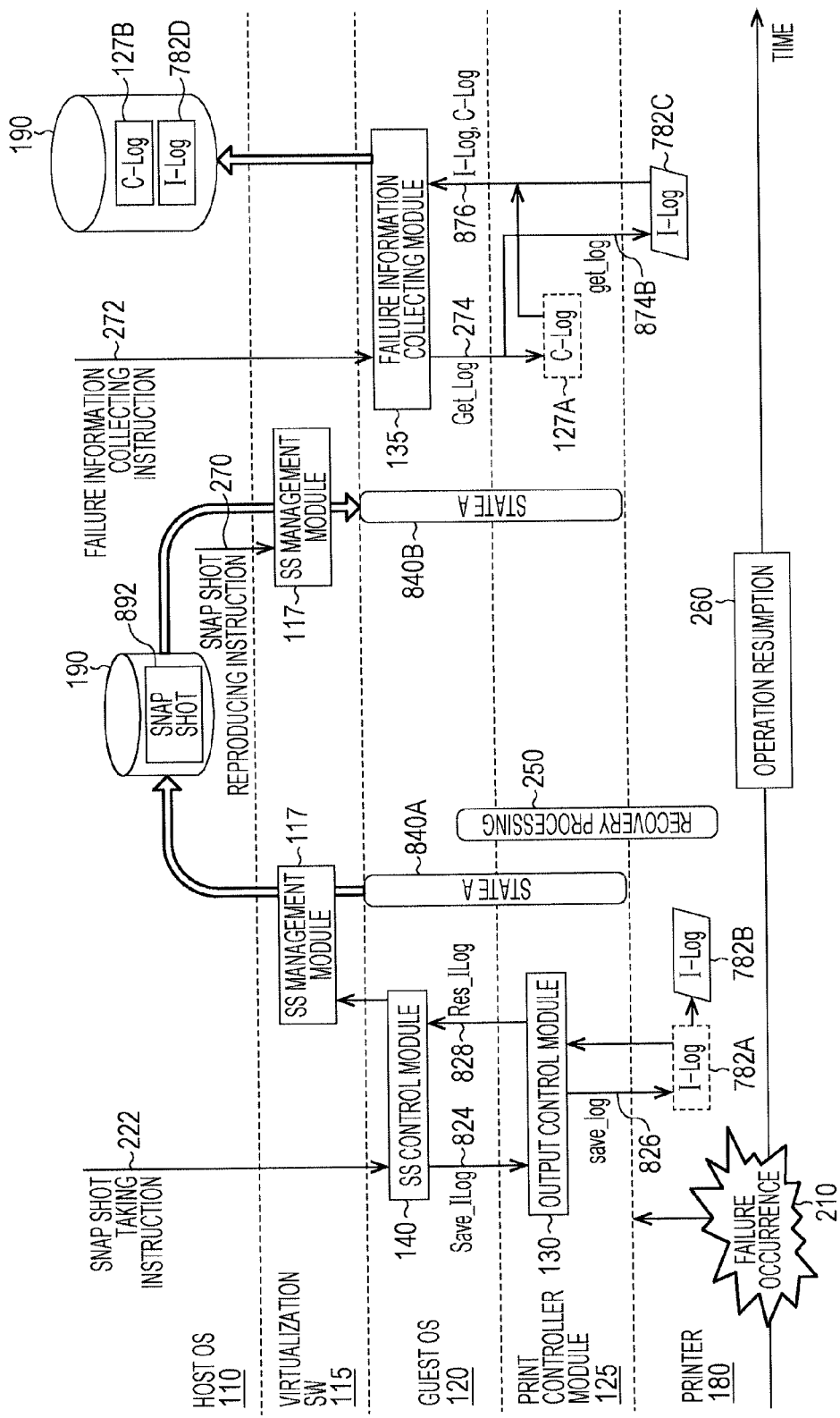
FIG. 8 is an explanatory diagram illustrating a processing example according to the second exemplary embodiment.

FIG. 8 is an explanatory diagram illustrating a processing example according to the second exemplary embodiment.

The information processing device 700 operates to cause the printer 180 to perform printing processing, and it is assumed that failure occurrence 210 happens during the operation.

When the failure occurrence 210 is detected, the snap shot taking instruction 222 is issued to the SS control module 140 on the guest OS 120. The SS control module 140 issues a Save_ILog 824 instruction to the print controller module 125. Under the control by the print controller module 125, the output control module 130 issues a save_log 826 instruction to the printer 180, and the printer 180 copies the I-Log 782A to generate an I-Log 782B (corresponding to the I-Log 782A in the example of FIG. 7) and stores the generated I-Log 782B. Upon receiving a completion notification from the printer 180, the print controller module 125 (output control module 130) responds with a Res_ILog 828 which indicates completion of the processing to the SS control module 140. Then, the SS control module 140 receives the Res_ILog 828, and requests the SS management module 117 within the virtualization SW 115 for snap shot processing. The SS management module 117 stores a state A: 840A of the guest OS 120 and the print controller module 125 as a snap shot 892 in the storage region 190. After that, the recovery processing 250, which is recovery from the failure, is performed, and the operation resumption 260 is achieved.

Then, after predetermined printing processing is completed (or at a time in which no printing service is being performed), the SS management module 117 receives the snap shot reproducing instruction 270 in accordance with a user operation, and reproduces a state A: 840B (state A: 840A) at the time of occurrence of the failure by using the snap shot 892 in the storage region 190. Then, in accordance with the failure information collecting instruction 272, the failure information collecting module 135 issues the Get_Log 274 instruction to the print controller module 125. The print controller module 125 issues a get_log 874B to the printer 180 and acquires an I-Log 782C (I-Log 782B). Then, the C-Log 127A, which is log information of inside the print controller module 125 and the guest OS 120, and the I-Log 782C are delivered to the failure information collecting module 135 (I-Log and C-Log 876). Then, the C-Log 127B (C-Log 127A) and an I-Log 782D (I-Log 782C, I-Log 782B, and I-Log 782A) are stored in the storage region 190. By analyzing the C-Log 127B and the I-Log 782D, a cause of the failure, countermeasures against the failure, and the like are considered. After the failure occurs, in order to continue printing processing at the printer 180, the recovery processing 250 and the operation resumption 260 are performed without logs being collected and analyzed. In particular, in the case where the printer 180 is a high-speed printer, there is a demand for shortening the down period (period during which printing may not be performed).

FIGS. 9 and 10 are flowcharts illustrating processing examples (a processing example of generating the snap shot 892 and a processing example of storing the I-Log 782A) according to the second exemplary embodiment.

In step S902, it is determined whether or not failure occurrence is detected. When failure occurrence is detected, the process proceeds to step S904. When failure occurrence is not detected, the process waits until failure occurrence is detected.

In step S904, the snap shot taking instruction 222 is issued in accordance with a user operation. As described above, by monitoring the status inside the print controller module 125, a taking instruction may be issued automatically.

In step S906, the SS control module 140 receives the snap shot taking instruction 222.

In step S908, the SS control module 140 issues an I-Log storing instruction (Save_ILog 824).

In step S910, the output control module 130 receives the I-Log storing instruction (Save_ILog 824).

In step S912, the output control module 130 issues an I-Log storing instruction (save_log 826).

In step S914, the printer 180 receives the I-Log storing instruction (save_log 826).

In step S916, the printer 180 stores the I-Log 182A (I-Log 782B).

In step S918, the printer 180 responds with a notification indicating that storing of the I-Log is completed.

In step S920, the output control module 130 responds with a notification indicating that storing of the I-Log in the printer 180 is completed (Res_ILog 828).

In step S922, the SS control module 140 receives the Res_ILog 828.

In step S924, the SS control module 140 issues a snap shot creating instruction.

In step S926, the SS management module 117 receives the snap shot creating instruction.

In step S928, the SS management module 117 stores the current state A: 840A as the snap shot 892 in the storage region 190.

FIG. 11 is a flowchart illustrating a processing example (processing example of reproducing the snap shot 892) according to the second exemplary embodiment.

In step S1102, in accordance with a user operation, the snap shot reproducing instruction 270 is issued.

In step S1104, the SS management module 117 receives the snap shot reproducing instruction 270.

In step S1106, the SS management module 117 reproduces the state A: 840B by using the snap shot 892 within the storage region 190.

Figure 12:
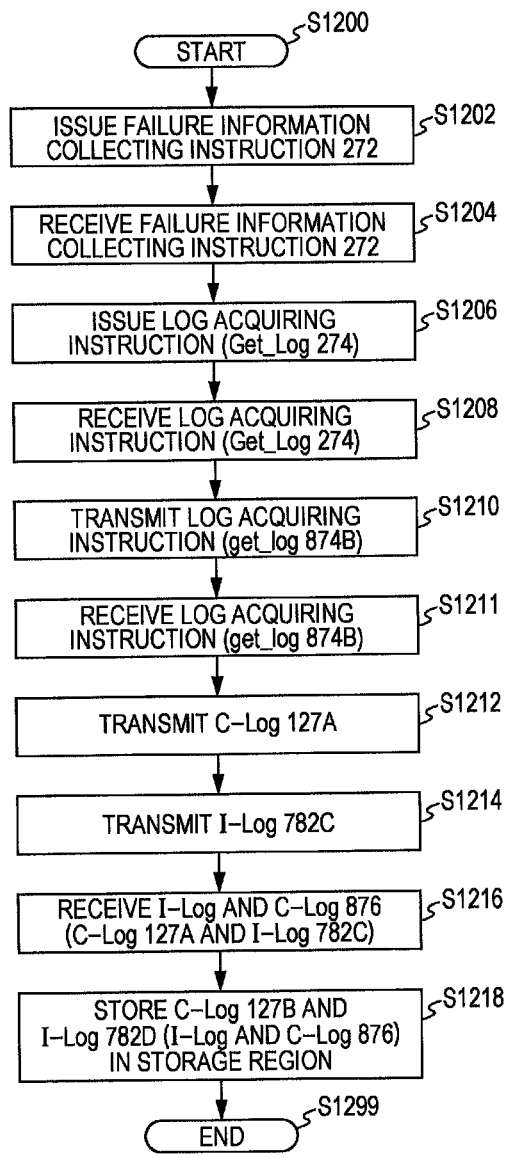
FIG. 12 is a flowchart illustrating a processing example according to the second exemplary embodiment.

FIG. 12 is a flowchart illustrating a processing example (processing example of collecting the C-Log 127A and an I-Log 782D, which are failure information) according to the second exemplary embodiment.

In step S1202, in accordance with a user operation, the failure information collecting instruction 272 is issued.

In step S1204, the failure information collecting module 135 receives the failure information collecting instruction 272.

In step S1206, the failure information collecting module 135 issues a log acquiring instruction (Get_Log 274).

In step S1208, the print controller module 125 receives the log acquiring instruction (Get_Log 274).

In step S1210, the print controller module 125 transmits a log acquiring instruction (get_log 874B).

In step S1211, the printer 180 receives the log acquiring instruction (get_log 874B).

In step S1212, the print controller module 125 transmits the C-Log 127A.

In step S1214, the printer 180 transmits an I-Log 782C.

In step S1216, the failure information collecting module 135 receives an I-Log and a C-Log 876 (C-Log 127A and I-Log 782C).

In step S1218, the failure information collecting module 135 stores the C-Log 127B and an I-Log 782D (I-Log and C-Log 876) in the storage region 190.

Third Exemplary Embodiment

Figure 13:
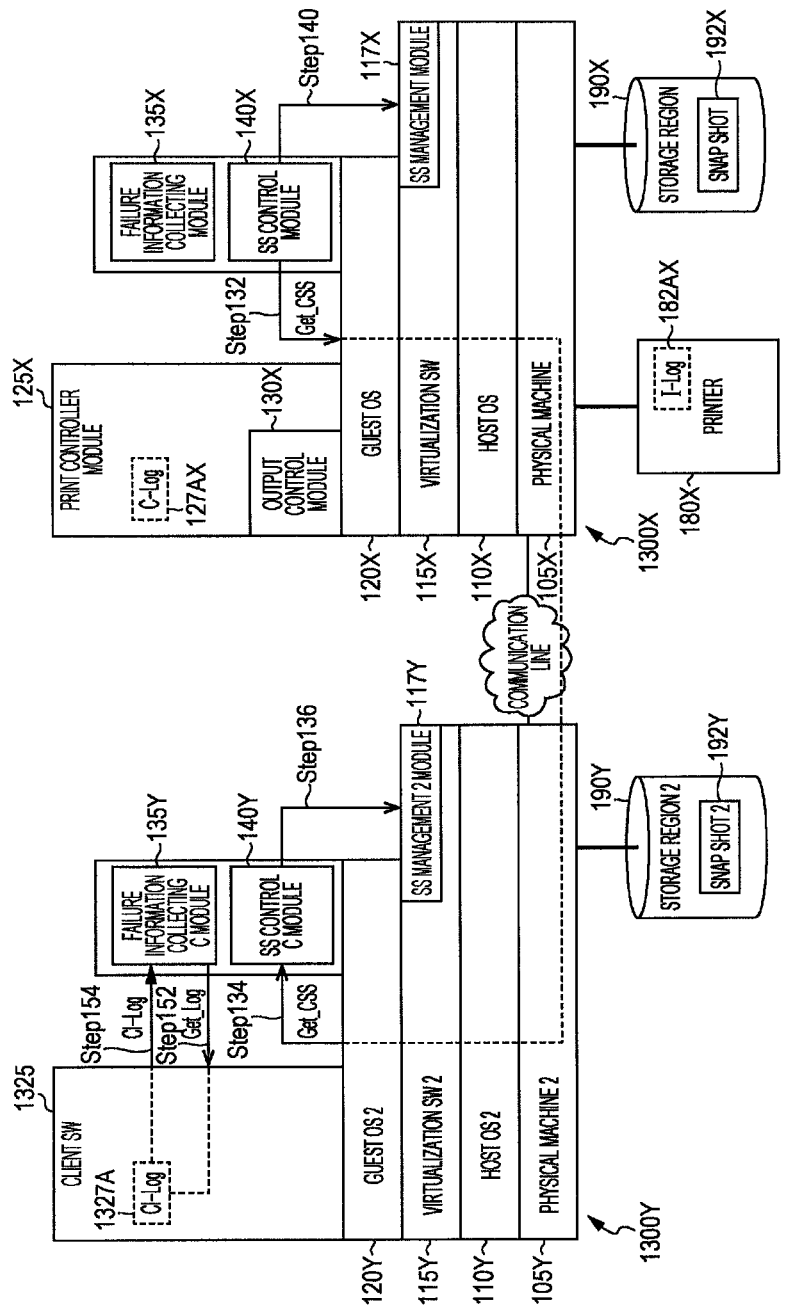
FIG. 13 is a conceptual module configuration diagram of a configuration example according to a third exemplary embodiment.

FIG. 13 is a conceptual module configuration diagram illustrating a configuration example of a third exemplary embodiment. An information processing device 1300X causes a printer 180X to perform printing processing in response to a printing request from an information processing device 1300Y (client SW 1325). When a failure occurs, log information of the information processing device 1300Y as well as log information of the information processing device 1300X is acquired.

The information processing device 1300X, which is a virtual computer system, includes a physical machine 105X, a host OS 110X, a virtualization SW 115X, and a guest OS 120X in that order from the bottom layer, and a print controller module 125X, a failure information collecting module 135X, and an SS control module 140X are provided on the guest OS 120X. The virtualization SW 115X includes an SS management module 117X, and the print controller module 125X includes an output control module 130X and stores a C-Log 127AX. The printer 180X stores an I-Log 182AX. A storage region 190X stores a snap shot 192X.

The information processing device 1300Y, which is a virtual computer system, includes a physical machine 2 105Y, a host OS 110Y, a virtualization SW 2 115Y, and a guest OS 2 120Y in that order from the bottom layer, and a client SW 1325, a failure information collecting C module 135Y, and an SS control C module 140Y are provided on the guest OS 2 120Y. The virtualization SW 2 115Y includes an SS management 2 module 117Y, and the client SW 1325 stores a Cl-Log 1327A. A storage region 2 190Y stores a snap shot 2: 192Y.

The information processing device 1300X and the information processing device 1300Y are connected through a communication line.

The SS control module 140X of the information processing device 1300X causes the information processing device 1300Y to store a snap shot of the information processing device 1300Y (a virtual computer which has transmitted a printing request to the information processing device 1300X), which is different from the information processing device 1300X.

In the case where the information processing device 1300Y (client device), which is an external device connected to the information processing device 1300X, which is a print controller, through a communication line, is operating under a virtualization environment in a manner similar to the information processing device 1300X, if a failure occurs on the information processing device 1300X side (including the printer 180X), the SS control module 140X of the information processing device 1300X issues an instruction (Get_CSS) for taking a snap shot to the SS control C module 140Y of the information processing device 1300Y, in accordance with a snap shot taking instruction (Step 132 and step 134).

Upon receiving the snap shot taking instruction, the SS control C module 140Y instructs the SS management 2 module 117Y to create a snap shot of the guest OS 2 120Y on which the client SW 1325 operates (Step 136), and therefore the snap shot of the client SW 1325 is created as a snap shot 2: 192Y in the storage region 2 190Y for the client SW 1325. At this time, the SS control module 140X of the information processing device 1300X performs log processing and creates a snap shot of the guest OS 120X as in the foregoing exemplary embodiment (Step 140).

Then, after recovery from the failure is achieved and predetermined printing processing is completed (or at a time in which no printing service is being performed), the information processing device 1300X, as in the processing example according to the foregoing exemplary embodiment, reproduces the snap shot 192X and then acquires log information (C-Log 127AX) of inside the print controller module 125 and the guest OS 120X and log information (I-Log 182AX) of the printer 180.

Apart from this, also in the information processing device 1300Y (client SW 1325), the SS management 2 module 117Y of the information processing device 1300Y reproduces the state at the time of occurrence of the failure by using the snap shot 2: 192Y created in advance and stored within the storage region 2 190Y, in accordance with an instruction for reproducing a snap shot from the SS management module 117X of the information processing device 1300X. Then, the failure information collecting C module 135Y requires log information (Cl-Log 1327A) of the information processing device 1300Y (client SW 1325) (Step 152), and acquires the log information (Step 154). Then, the failure information collecting C module 135Y transmits the acquired Cl-Log 1327A to the failure information collecting module 135X of the information processing device 1300X. The failure information collecting module 135X of the information processing device 1300X acquires the Cl-Log 1327A of the information processing device 1300Y, along with the C-Log 127AX and the I-Log 182AX. By analyzing the C-Log 127AX, the I-Log 182AX, and the Cl-Log 1327A of the information processing device 1300Y from which the printing request has been sent, a cause of the failure, countermeasures against the failure, and the like are considered.

Fourth Exemplary Embodiment

In fourth and later exemplary embodiments, the storage region 190 is an external device, and print data, which is processing data by the printer 180, is acquired as failure information.

Before explanation of the fourth exemplary embodiment will be provided, related arts will be explained with reference to examples of FIGS. 25 to 28. The explanation below will be provided to achieve easier understanding of the fourth and later exemplary embodiments.

Figure 25:
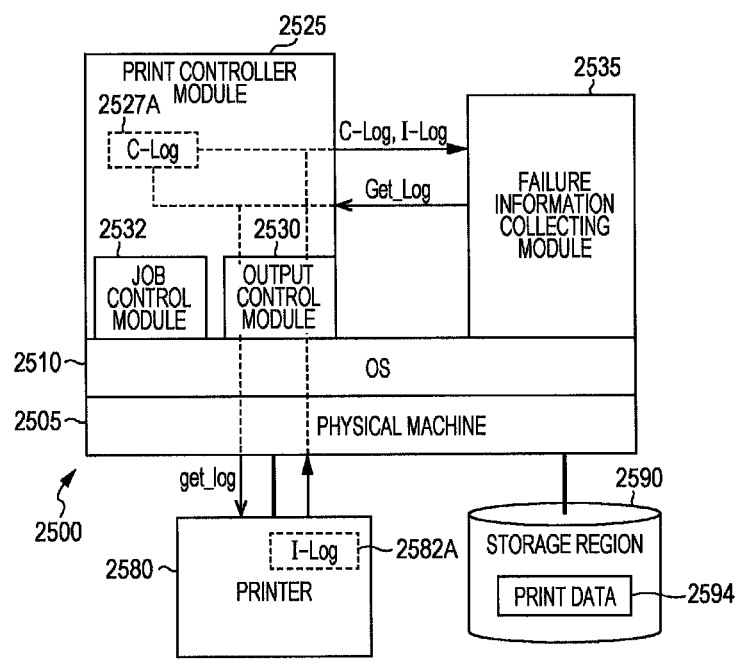
FIG. 25 is an explanatory diagram illustrating an example of a related art.

FIG. 25 is an explanatory diagram illustrating an example of a related art. An information processing device 2500 controls a printer 2580 and a storage region 2590, which are external devices, to perform printing processing. The information processing device 2500 is a general computer (a computer in which a single OS 2510 is provided for a single physical machine 2505), which is not a virtual computer system. For example, the information processing device 2500 functions as a printer server or a printer controller, and the printer 2580 is a high-speed printer.

The information processing device 2500 includes the physical machine 2505 and the OS 2510 in that order from the bottom layer, and a print controller module 2525 and a failure information collecting module 2535 are provided on the OS 2510. The print controller module 2525 includes an output control module 2530 and a job control module 2532, and stores a C-Log 2527A. The printer 2580 stores an I-Log 2582A. The storage region 2590 stores print data 2594.

When a failure occurs in the information processing device 2500 or the printer 2580, the print controller module 2525 collects log information (C-Log 2527A) of inside thereof and the OS 2510, in accordance with an instruction (Get_Log) from the failure information collecting module 2535. The failure may be caused by the printer 2580, which is outside the control of the print controller module 2525. Therefore, the print controller module 2525 also collects log information of the printer 2580 (I-Log 2582A) through the output control module 2530 which is arranged inside the print controller module 2525 (in accordance with a get_log instruction to the printer 2580 from the output control module 2530), and transmits the C-Log 2527A and the I-Log 2582A to the failure information collecting module 2535. Then, the failure information collecting module 2535 stores the C-Log 2527A and the I-Log 2582A in the storage region 2590. Although the print data 2594, which a processing target of the job control module 2532, is to be included as failure information, the job control module 2532 is not included as failure information.

Figure 26:
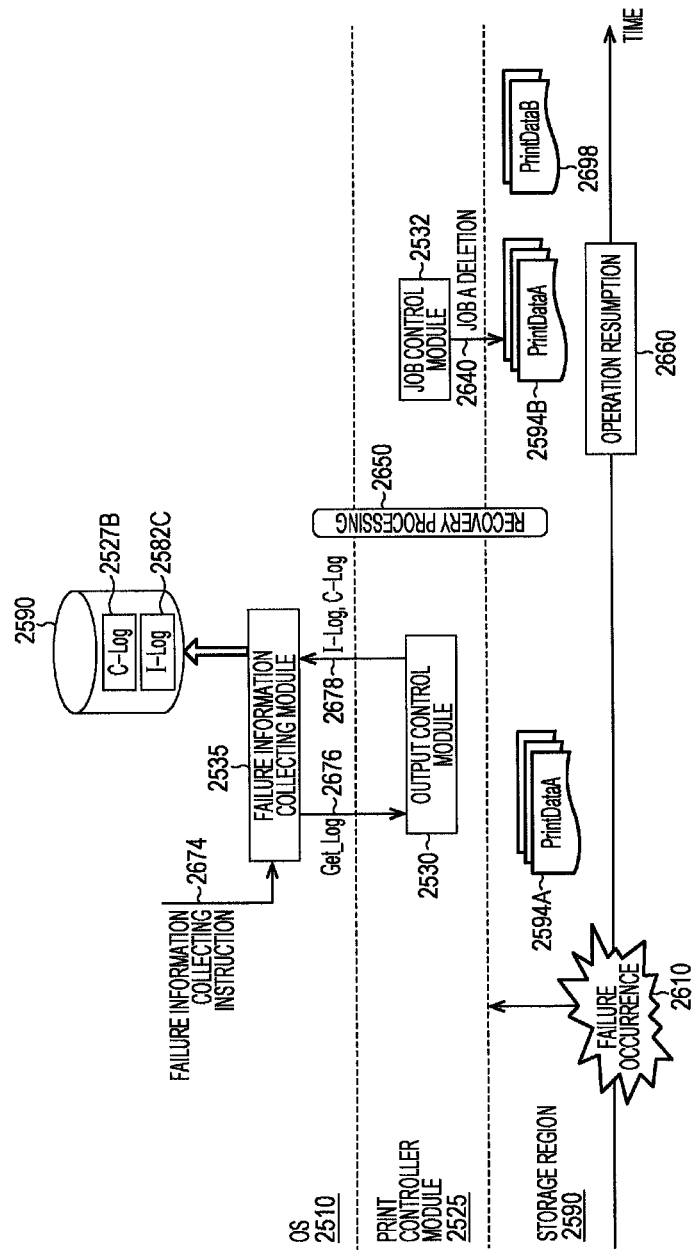
FIG. 26 is an explanatory diagram illustrating a processing example according to a related art.

FIG. 26 is an explanatory diagram illustrating a processing example according to a related art.

The information processing device 2500 operates to cause the printer 2580 to perform printing processing, and it is assumed that failure occurrence 2610 happens during the operation. At this time, target data of the job control module 2532 is PrintDataA 2594A.

When the failure occurrence 2610 is detected, a failure information collecting instruction 2674 is issued to the failure information collecting module 2535 on the OS 2510. The failure information collecting module 2535 issues the failure information collecting instruction 2674 to the print controller module 2525, and acquires a state (I-Log) of inside the print controller module 2525 and the OS 2510 at that time and a state (C-Log) of the printer 2580 at that time acquired by the output control module 2530 (I-Log and C-Log 2678). Then, the failure information collecting module 2535 stores the states as a C-Log 2527B and an I-Log 2582C in the storage region 2590. After that, failure recovery processing 2650 is performed, and operation resumption 2660 is achieved. In this case, target data of the job control module 2532 is PrintDataA 2594B (PrintDataA 2594A at the time of the failure occurrence 2610). When the operation is completed (when printing of the PrintDataA 2594B is completed), job A deletion 2640 is performed. Then, the next PrintDataB 2698 becomes a processing target of the job control module 2532.

After that, by analyzing the C-Log 2527B and the I-Log 2582C after the operation of the printer 2580 is completed, a cause of the failure, countermeasures against the failure, and the like are considered. However, by that time, the PrintDataA 2594A (PrintDataA 2594B) has already been deleted and may not be collected as failure information (at the time of consideration, the PrintDataB 2698, which is different from the PrintDataA 2594A). After the logs are collected, in order to continue printing processing at the printer 2580, the recovery processing 2650 and the operation resumption 2660 are performed without the logs being analyzed. In particular, in the case where the printer 2580 is a high-speed printer, there is a demand for shortening the down period (period during which printing may not be performed).

Figure 27:
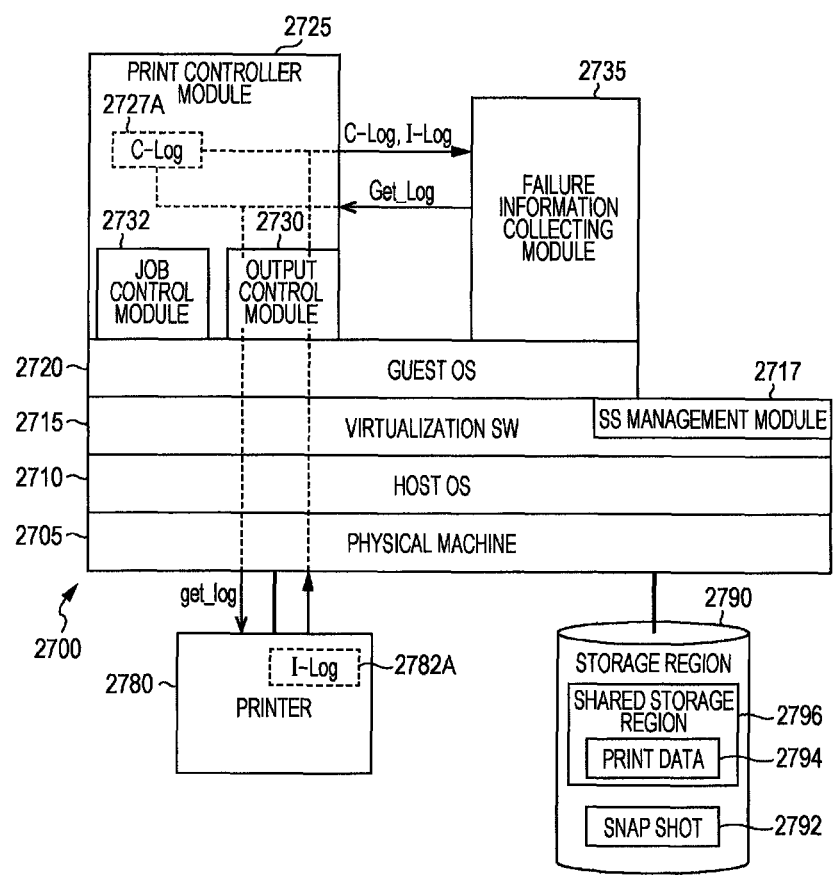
FIG. 27 is an explanatory diagram illustrating an example of a related art.

Next, an example of a virtual computer system will be explained. FIG. 27 is an explanatory diagram illustrating an example of a related art. An information processing device 2700 is a virtual computer system, and controls a printer 2780 and a storage region 2790, which are external devices, to perform printing processing. For example, the information processing device 2700 functions as a printer server, and the printer 2780 is a high-speed printer.

As illustrated in the example of FIG. 27, virtual hardware by a host OS 2710 and a virtualization SW 2715 is established on a physical machine 2705, a guest OS 2720 is installed on the virtual hardware, and a print controller module 2725, which is an application program (application), is installed on the guest OS 2720.

The virtualization SW 2715 is software which allows multiple guest OSs 2720 to coexist in parallel on the physical machine 2705. That is, the virtualization SW 2715 establishes hardware such as a CPU, a memory, and an HDD in a software manner and prepares a hardware resource on which the guest OSs 2720 depend as a virtual machine.

For example, a printer control program (a specific example includes a digital front end) is used as the print controller module 2725. In this case, virtual machines are separated from one another, and even if a failure (for example, crash etc.) occurs in any of the virtual machines, a printer control program on a different virtual machine continues to operate and is therefore able to perform printing.

Specifically, the information processing device 2700 includes the physical machine 2705, the host OS 2710, the virtualization SW 2715, and the guest OS 2720 in that order from the bottom layer, and the print controller module 2725 and a failure information collecting module 2735, which are application programs, are provided on the guest OS 2720. The virtualization SW 2715 includes an SS management module 2717, and the print controller module 2725 includes an output control module 2730 and a job control module 2732 and stores a C-Log 2727A. The printer 2780 stores an I-Log 2782A. The storage region 2790 stores a shared storage region 2796 which includes a snap shot 2792 and print data 2794. In the example of FIG. 27, an example in which the single guest OS 2720 is provided on the virtualization SW 2715 is illustrated. However, since the information processing device 2700 is a virtual computer system, multiple guest OSs 2720 may be provided on the virtualization SW 2715.

In the information processing device 2700, the print controller module 2725, which is an application program, is caused to operate under a virtualization environment, a failure state at the time of occurrence of a failure is held in the storage region 2790 as a snap shot 2792 by using a snap shot function (function of the SS management module 2717) under the virtualization environment, recovery from the failure is achieved, and after predetermined printing processing is completed (at a time in which no printing service is being performed), the state at the time of occurrence of the failure is reproduced by using the stored snap shot 2792 and then failure information is obtained. Here, creation and reproduction of the snap shot of the guest OS 2720 on which the print controller module 2725 operates is performed by the SS management module 2717.

Figure 28:
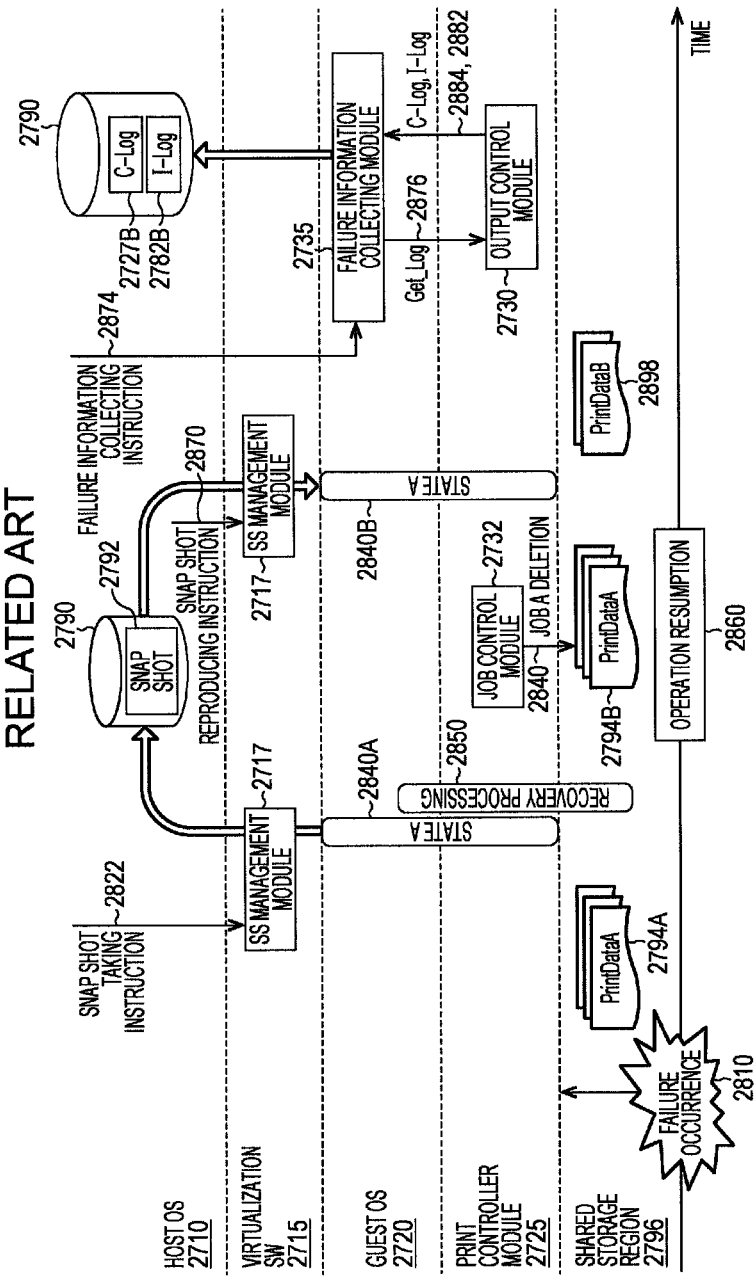
FIG. 28 is an explanatory diagram illustrating a processing example according to a related art.

Explanation will be provided with reference to an example of FIG. 28. The information processing device 2700 operates to cause the printer 2780 to perform printing processing, and it is assumed that failure occurrence 2810 happens during the operation.

When the failure occurrence 2810 is detected, a snap shot taking instruction 2822 is issued to the SS management module 2717 in accordance with a user operation. The SS management module 2717 stores the state A: 2840A of the guest OS 2720 and the print controller module 2725 at that time as the snap shot 2792 in the storage region 2790. At that time, the job control module 2732 is performing printing processing for PrintDataA 2794A in the shared storage region 2796. However, the snap shot of the SS management module 2717 is obtained by acquiring the state inside the information processing device 2700, and therefore the PrintDataA 2794A in the shared storage region 2796, which is an external device, is not a target of the snap shot.

After that, failure recovery processing 2850 is performed, and operation resumption 2860 is achieved. In this case, target data of the job control module 2732 is PrintDataA 2794B (PrintDataA 2794A at the time of the failure occurrence 2810). When the operation is completed (when printing of the PrintDataA 2794B is completed), job A deletion 2840 is performed. Then, the next PrintDataB 2898 becomes a processing target of the job control module 2732.

After the operation of the printer 2780 is completed, when a snap shot reproducing instruction 2870 is issued to the SS management module 2717 in accordance with a user operation, the SS management module 2717 reads the snap shot 2792 within the storage region 2790 and returns the state of the guest OS 2720 and the print controller module 2725 to the state A: 2840 B (the same state as the state A: 2840A). Then, in accordance with a user operation, a failure information collecting instruction 2874 is issued to the failure information collecting module 2735, and processing similar to that illustrated in the example of FIG. 26 is performed. That is, the failure information collecting module 2735 issues a Get_Log 2876 instruction to the print controller module 2725, and acquires the state of inside the print controller module 2725 and the guest OS 2720 at that time as a C-Log 2884 and an I-Log 2882. The failure information collecting module 2735 stores the states as a C-Log 2727B and an I-Log 2782B in the storage region 2790.

In the case where print data within the shared storage region 2796 (storage region 2790), which is outside the control of the information processing device 2700, is collected using the failure information collecting module 2735, printing processing (operation resumption 2860) is performed during the time between the failure occurrence 2810 and the failure information collecting instruction 2874, as illustrated in the example of FIG. 28. Therefore, PrintDataB 2898 within the shared storage region 2796 at the time of the failure information collecting instruction 2874, in which target data in printing processing after the failure (printing processing after the operation resumption 2860) is written, is different from the I-Log 2782A, which is log information of the printer 2780 at the time of occurrence of the failure. Thus, depending on the printing processing after the operation resumption 2860 within the printer 2780, a situation in which the PrintDataA 2794A, which is target data at the time of occurrence of the failure, has already been deleted, may occur. That is, the PrintDataA 2794A at the time of the failure occurrence 2810 is not stored in the storage region 2790 in accordance with the failure information collecting instruction 2874.

In the information processing device 2700 illustrated in the example of FIG. 27, a snap shot including all data has a large size, and a resource which is taken in by a certain operation, a stored job which is newly created, and the like are to be used for another operation and are therefore arranged in the storage region 2790 (shared storage region 2796) outside the information processing device 2700. In addition, by arranging print data (PrintDataA 2794A etc.) to be temporarily used in the storage region 2790 (shared storage region 2796), the volume of a snap shot is reduced.

However, when the state at the time of occurrence of a failure is tried to be reproduced using a snap shot, data arranged in the storage region 2790 (shared storage region 2796) may change and the failure may not be reproduced. For example, in the case where print data is stored in the storage region 2790 (shared storage region 2796), if a snap shot is used to reproduce the state at the time of occurrence of a failure after recovery from the failure is performed and printing processing is completed as described above, the snap shot that is used for reproducing the state at the time of occurrence of the failure does not include print data at the time of occurrence of the failure, which makes it difficult to reproduce the state at the time of occurrence of the failure.

In order to reproduce the state at the time of occurrence of the failure, it is necessary to store data which is required for printing processing and to be deleted or changed after the printing processing is completed.

Figure 18:
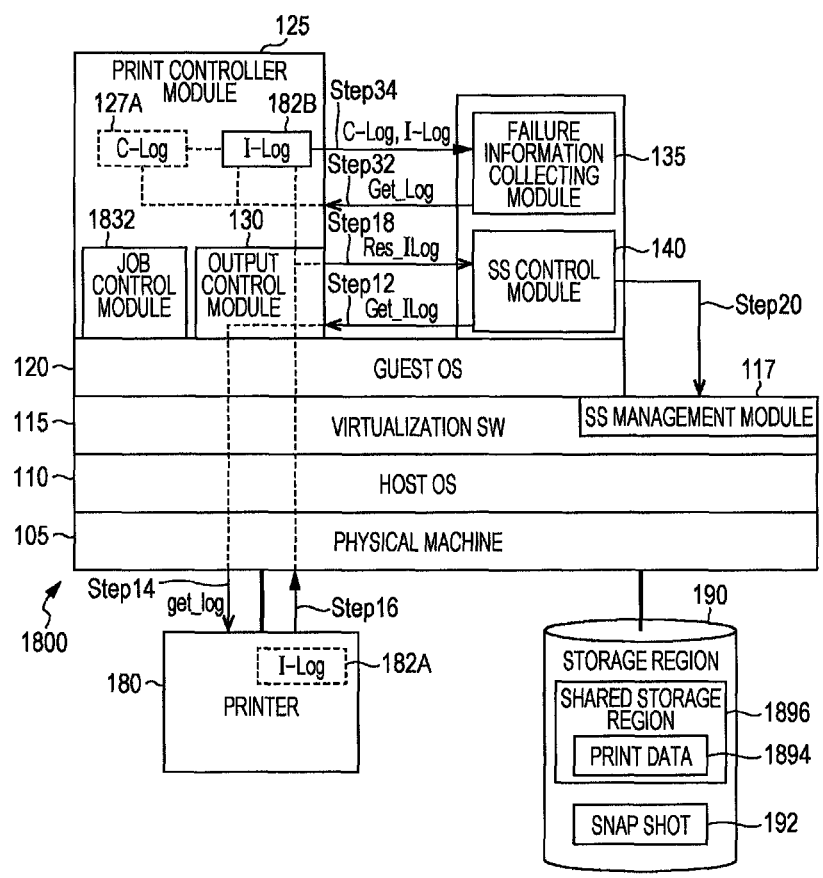
FIG. 18 is a conceptual module configuration diagram of a configuration example according to a fourth exemplary embodiment.

FIG. 18 is a conceptual module configuration diagram of a configuration example according to the fourth exemplary embodiment.

An information processing device 1800 includes the physical machine 105, the host OS 110, the virtualization SW 115, and the guest OS 120 in that order from the bottom layer, and the print controller module 125, the failure information collecting module 135, and the SS control module 140 are provided on the guest OS 120. The virtualization SW 115 includes the SS management module 117, and the print controller module 125 includes the output control module 130 and a job control module 1832 and stores the C-Log 127A and the I-Log 182B. The printer 180 stores the I-Log 182A. The storage region 190 stores a shared storage region 1896 and the snap shot 192, and the shared storage region 1896 stores print data 1894.

The information processing device 1800 performs, as an overview, processing described below.

In the case where the print controller module 125 is caused to operate on the guest OS 120 and failure information is collected using a snap shot function of the virtual computer system, as described above, the time of occurrence of a failure greatly differs from the time of acquisition of failure information. Therefore, at the time of acquisition of failure information, the print data 1894 stored in the storage region 190, which is not a snap shot target, resource data, and the like may not hold data at the time of occurrence of the failure. Thus, a known failure information collecting function is distributed between the SS control module 140 and the failure information collecting module 135, and data (for example, print data 1894) regarding a job that is being processed at the time of occurrence of a failure is not deleted before a snap shot is taken, under the control by the SS control module 140.

Accordingly, by creating a snap shot immediately after a failure occurs, the original printing processing may be resumed immediately after failure recovery processing, without collecting failure information, which takes a long time. Then, by resuming the snap shot at a desired timing such as a timing after printing service is completed, failure information immediately after the occurrence of the failure (the print data 1894, which is information regarding a job as well as the print controller module 125 and the printer 180) may be acquired.

That is, a user of the printer 180 does not collect failure information regarding the occurrence of a failure. As a result, the operating ratio of the printer 180 may be increased.

Processing for collecting the C-Log 127A and the I-Log 182B is similar to processing of the information processing device 100 according to the first exemplary embodiment.

When a failure occurs in the information processing device 1800 or the printer 180, the SS control module 140 requires the print controller module 125 to collect job information that is being processed, in accordance with a snap shot taking instruction, and instructs the print controller module 125 to hold print data. The print controller module 125 obtains the file name of the print data 1894 that is currently being processed through the job control module 1832, and creates a file (in this case, PrintDataA.lnk) which is linked with the file name of the print data (in this case, for example, PrintDataA) in the shared storage region 1896.

After the creation is completed, the print controller module 125 transmits a notification indicating that data holding is completed to the SS control module 140. The SS control module 140 instructs the SS management module 117 to create a snap shot of the guest OS 120.

Next, in order to prioritize user processing, recovery from the failure is achieved, and after predetermined printing processing is completed, PrintDataA, which is the file name of the print data described above, is deleted. However, since there is a linked file, the entity is not deleted.

When a snap shot reproducing instruction is issued to the SS management module 117 to collect failure information, the internal state at the time of acquisition of the snap shot is returned, and by executing processing for returning the name of the print data (PrintDataA.lnk) to the original name (restoration of the print data name), the deleted print data is restored.

When a failure information collecting instruction is issued, the failure information collecting module 135 obtains the name of the print data that is being processed from the job control module 1832 and collects the print data 1894 from the shared storage region 1896. The failure information collecting module 135 also collects the C-Log 127A within the print controller module 125 and the I-Log 182B, which is log information of the printer 180, and extracts them as failure information.

Accordingly, the state including the print data 1894 at the time of occurrence of the failure is restored, and collection of information of the failure caused by the print data 1894 may be achieved.

The above-mentioned creation of a link file only includes link information, and the entity is not copied. Therefore, only a short processing time and a small disk space are used.

Figure 19:
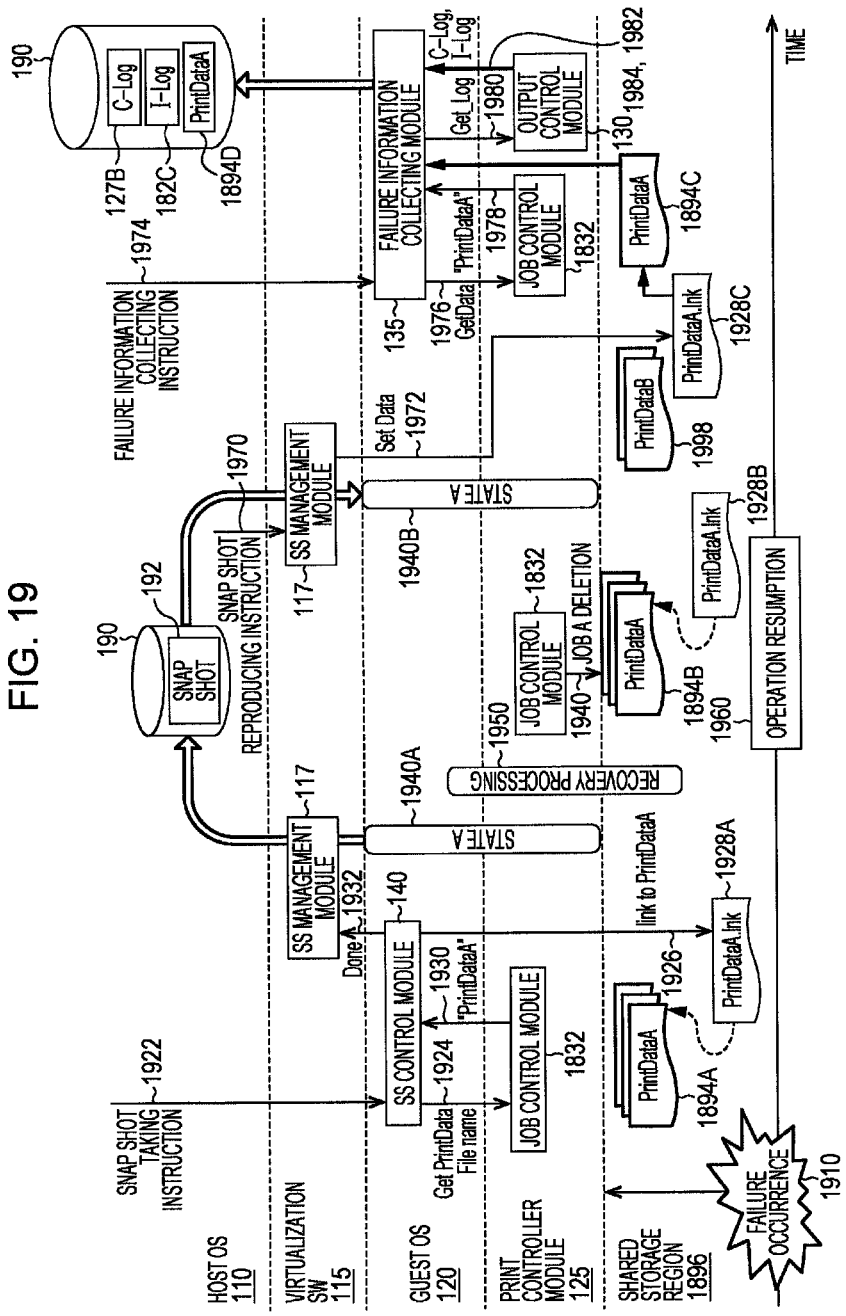
FIG. 19 is an explanatory diagram illustrating a processing example according to the fourth exemplary embodiment.

FIG. 19 is an explanatory diagram illustrating a processing example according to the fourth exemplary embodiment.

The information processing device 1800 operates to cause the printer 180 to perform printing processing, and it is assumed that failure occurrence 1910 happens during the operation.

When the failure occurrence 1910 is detected, a snap shot taking instruction 1922 is issued to the SS control module 140 on the guest OS 120 in accordance with a user operation. By monitoring the status inside the print controller module 125, a taking instruction may be issued automatically. The SS control module 140 issues a Get PrintData File name 1924 instruction to the job control module 1832. The job control module 1832 acquires the file name (PrintDataA) of PrintDataA 1894A within the shared storage region 1896 under the control by the print controller module 125.

The job control module 1832 transmits "PrintDataA" 1930, which is a file name, to the SS control module 140. The SS control module 140 creates a file which is linked with the "PrintDataA" 1930 (in this case, PrintDataA.lnk 1928A which links Link to PrintDataA 1926 with the PrintDataA 1894A) in the shared storage region 1896.

Then, the SS control module 140 transmits a Done 1932 which indicates that the processing is completed to the SS management module 117. The SS management module 117 stores the state A: 1940A of the guest OS 120 and the print controller module 125 as the snap shot 192 in the storage region 190. After that, recovery processing 1950, which is failure recovery, is performed, and operation resumption 1960 is achieved. In this operation, printing processing of the PrintDataA 1894B is completed. The job control module 1832 performs job A deletion 1940 for the PrintDataA 1894B (PrintDataA 1894A). Therefore, although the PrintDataA 1894B is deleted, the PrintDataA.lnk 1928A exists, and therefore the entity of the PrintDataA 1894B is not deleted. In the next printing processing, PrintDataB 1998 (different from the PrintDataA 1894B) becomes target data.

Then, recovery from the failure is achieved, and after predetermined printing processing is completed (at a time in which no printing service is being performed), the SS management module 117 receives a snap shot reproducing instruction 1970 in accordance with a user operation, and reproduces the state A: 1940B (state A: 1940A) at the time of occurrence of the failure by using the snap shot 192 within the storage region 190. Then, the SS management module 117 performs Set Data 1972 (restoration of print data name) for PrintDataA.lnk 1928C. Accordingly, the PrintDataA 1894C (PrintDataA 1894B) is restored.

In accordance with a failure information collecting instruction 1974, the failure information collecting module 135 acquires "PrintDataA" 1978 (PrintDataA 1894C) within the shared storage region 1896 from the job control module 1832, in accordance with a GetData 1976 instruction to the print controller module 125. Then, the failure information collecting module 135 acquires an I-Log 1982 and a C-Log 1984 from the output control module 130 in accordance with a Get_Log 1980 instruction to the print controller module 125. Then, the C-Log 127B (C-Log 1984), the I-Log 182C (I-Log 1982), PrintDataA 1894D (PrintDataA 1894C) are stored in the storage region 190. By analyzing the C-Log 127B, the I-Log 182C, and the PrintDataA 1894D, a cause of the failure, countermeasures against the failure, and the like are considered. In particular, the state including print data at the time of occurrence of the failure is restored, and information of the failure caused by print data may be collected. After the logs are collected, in order to continue printing processing at the printer 180, the recovery processing 1950 and the operation resumption 1960 are performed without the logs being analyzed. In particular, in the case where the printer 180 is a high-speed printer, there is a demand for shortening the down period (period during which printing may not be performed).

Figure 20:
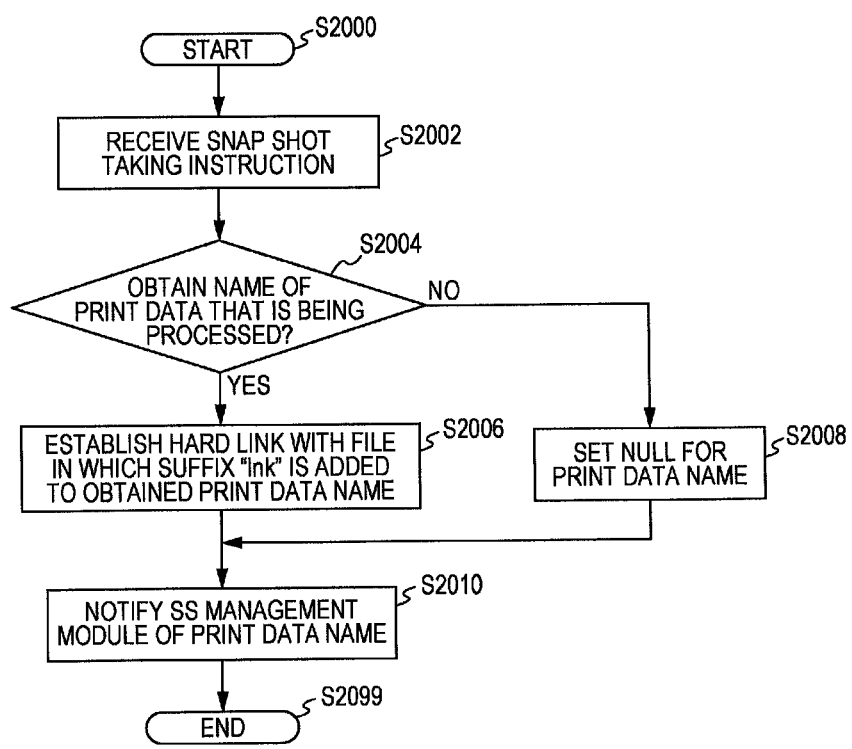
FIG. 20 is a flowchart illustrating a processing example according to the fourth exemplary embodiment.

FIG. 20 is a flowchart illustrating a processing example according to the fourth exemplary embodiment.

In step S2002, the SS control module 140 receives the snap shot taking instruction 1922.

In step S2004, the SS control module 140 determines whether or not the name of print data that is being processed is obtained. When the name of the print data that is being processed is obtained, the process proceeds to step S2006. When the name of the print data that is being processed is not obtained, the process proceeds to step S2008.

In step S2006, the SS control module 140 establishes a hard link with a file in which a suffix of "lnk" is added to the obtained print data name.

In step S2008, the SS control module 140 sets NULL for the print data name.

In step S2010, the SS control module 140 notifies the SS management module 117 of the print data name.

Figure 21:
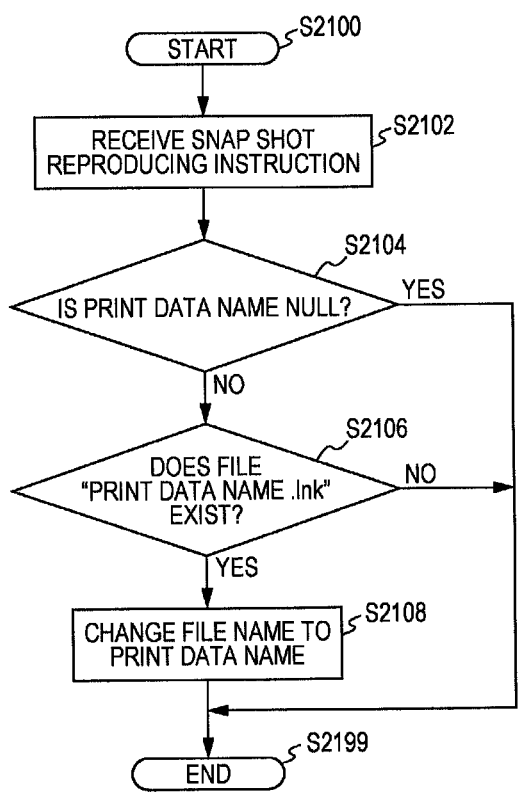
FIG. 21 is a flowchart illustrating a processing example according to the fourth exemplary embodiment.

FIG. 21 is a flowchart illustrating a processing example according to the fourth exemplary embodiment.

In step S2102, the SS management module 117 receives the snap shot reproducing instruction 1970.

In step S2104, the SS management module 117 determines whether or not the print data name is NULL. When the print data name is NULL, the process ends (step S2199). When the print data name is not NULL, the process proceeds to step S2106.

In step S2106, the SS management module 117 determines whether or not a file "print data name.lnk" exists. When the file "print data name.lnk" exists, the process proceeds to step S2108. When the file "print data name.lnk" does not exist, the process ends (step S2199).

In step S2108, the SS management module 117 changes the file name to the print data name (specifically, ".lnk" is deleted).

Fifth Exemplary Embodiment

Figure 22:
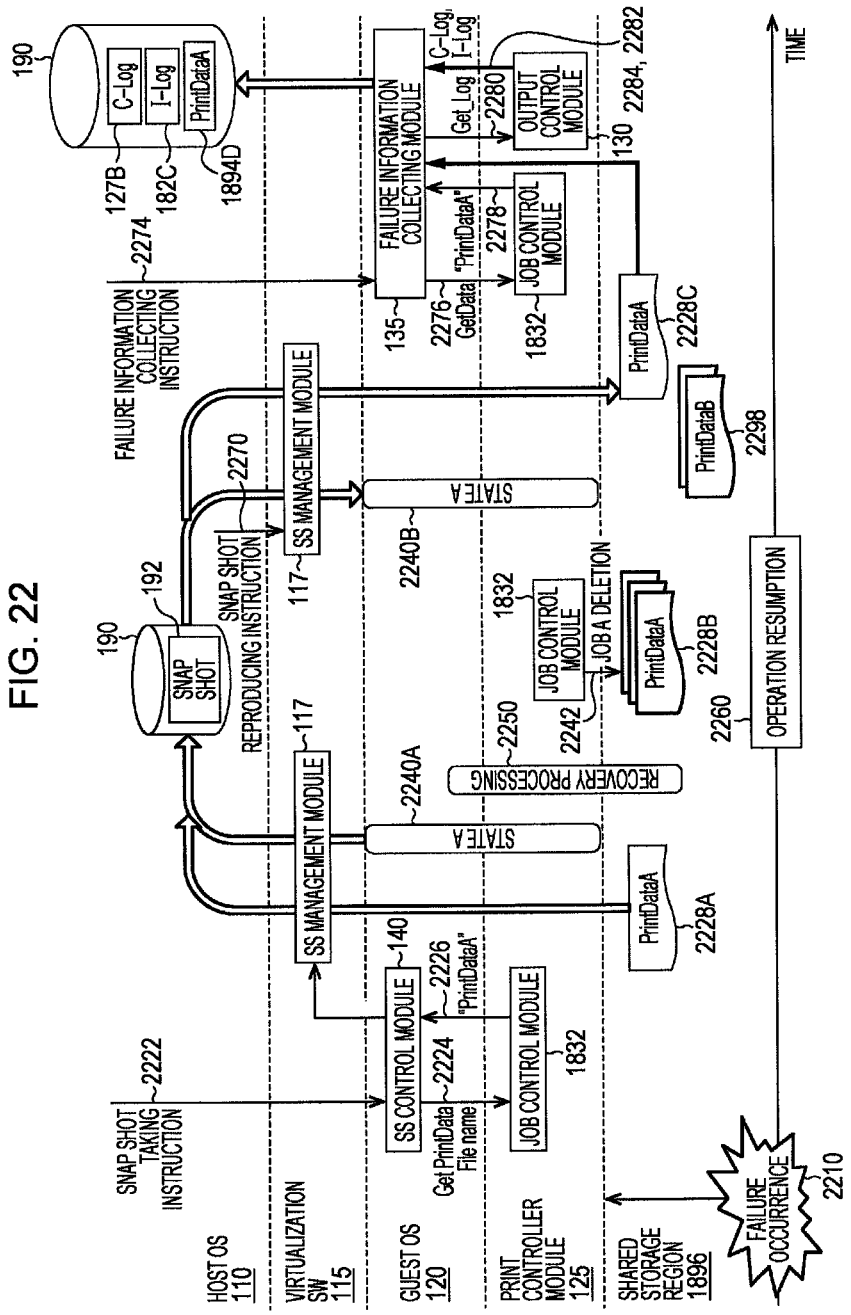
FIG. 22 is an explanatory diagram illustrating a processing example according to a fifth exemplary embodiment.

FIG. 22 is an explanatory diagram illustrating a processing example according to a fifth exemplary embodiment. A module configuration example is similar to the configuration example according to the fourth exemplary embodiment (example illustrated in FIG. 18).

The SS control module 140, which issues instructions for collection of data information within the shared storage region 1896 and creation of a snap shot of the guest OS 120 on which the print controller module 125 operates by using the SS management module 117, is introduced, and deleted print data information is restored in the storage region 190.

Processing for collecting the C-Log 127A and the I-Log 182B is similar to the processing of the information processing device 100 according to the first exemplary embodiment.

When a failure occurs in the information processing device 1800 or the printer 180, the SS control module 140 requires the print controller module 125 to collect job information that is being processed, in accordance with a snap shot taking instruction. The print controller module 125 obtains the file name of the print data 1894 that is currently being processed through the job control module 1832, and delivers the file name to the SS control module 140. The SS control module 140 delivers the file name of the print data 1894 that is currently being processed to the SS management module 117, and instructs the SS management module 117 to perform snap shot processing including the print data 1894. The SS management module 117 creates a snap shot including the print data 1894 that is currently being processed.

Next, in order to prioritize user processing, recovery from the failure is achieved, and predetermined printing processing is completed. By the completion of the printing processing, the print data 1894 is deleted from the shared storage region 1896.

When a snap shot reproducing instruction is issued to the SS management module 117 to collect failure information, the internal state at the time of acquisition of the snap shot is recovered. At the same time, processing for returning the print data 1894 to the original state is performed, and the deleted print data 1894 is restored in the shared storage region 1896.

When a failure information collecting instruction is issued, the failure information collecting module 135 obtains the name of the print data that is being processed from the job control module 1832, and collects the print data 1894 from the shared storage region 1896. At the same time, the C-Log 127A within the print controller module 125 and the I-Log 182B, which is log information of the printer 180, are collected, and are extracted as failure information.

Accordingly, the state including the print data 1894 at the time of failure occurrence is restored, and information of the failure caused by the print data 1894 may be collected.

The example illustrated in FIG. 22 will be explained in detail.

The information processing device 1800 operates to cause the printer 180 to perform printing processing, and it is assumed that failure occurrence 2210 happens during the operation.

When the failure occurrence 2210 is detected, a snap shot taking instruction 2222 is issued to the SS control module 140 on the guest OS 120, in accordance with a user operation. By monitoring the status inside the print controller module 125, a taking instruction may be issued automatically. The SS control module 140 issues a Get PrintData File name 2224 instruction to the job control module 1832. The job control module 1832 acquires the file name (PrintDataA) of PrintDataA 2228A within the shared storage region 1896, under the control by the print controller module 125.

The job control module 1832 transmits "PritnDataA" 2226, which is a file name, to the SS control module 140. The SS control module 140 notifies the SS management module 117 of the "PrintDataA" 2226 as a snap shot target file. The SS management module 117 generates the snap shot 192 of the guest OS 120 and the print controller module 125 as the state A: 2240A, which includes specified print data (entity data of the "PrintDataA" 2226), and stores the snap shot 192 in the storage region 190. After that, recovery processing 2250, which is failure recover, is performed, and operation resumption 2260 is achieved. In this operation, printing processing for PrintDataA 2228B is completed. The job control module 1832 performs job A deletion 2242 for the PrintDataA 2228B (PrintDataA 2228A). Therefore, the PrintDataA 2228B is deleted from the shared storage region 1896. In the next printing processing, PrintDataB 2298 (different from the PrintDataA 2228B) becomes target data.

Then, recovery from the failure is achieved, and after predetermined printing processing is completed (at a time in which no printing service is being performed), the SS management module 117 receives a snap shot reproducing instruction 2270 in accordance with a user operation, and reproduces the state A: 2240B (state A: 2240A) at the time of occurrence of the failure by using the snap shot 192 within the storage region 190. Then, the SS management module 117 reproduces the PrintDataA 2228A (PrintDataA 2228C) within the snap shot 192 in the shared storage region 1896.

In accordance with a failure information collecting instruction 2274, the failure information collecting module 135 acquires "PrintDataA" 2278 (PrintDataA 2228C) within the shared storage region 1896 from the job control module 1832, in accordance with a GetData 2276 instruction to the print controller module 125. Then, the failure information collecting module 135 acquires an I-Log 2282 and a C-Log 2284 from the output control module 130, in accordance with a Get_Log 2280 instruction to the print controller module 125. Then, the C-Log 127B, the I-Log 182C, and PrintDataA 1894D (PrintDataA 2228C) are stored in the storage region 190. By analyzing the C-Log 127B, the I-Log 182C, and the PrintDataA 1894D, a cause of the failure, countermeasures against the failure, and the like are considered. In particular, the state including print data at the time of occurrence of the failure is restored, and information of the failure caused by the print data may be collected. After the logs are collected, in order to continue printing processing at the printer 180, the recovery processing 2250 and the operation resumption 2260 are performed without the logs being analyzed. In particular, in the case where the printer 180 is a high-speed printer, there is a demand for shortening the down period (period during which printing may not be performed).

Figure 23:
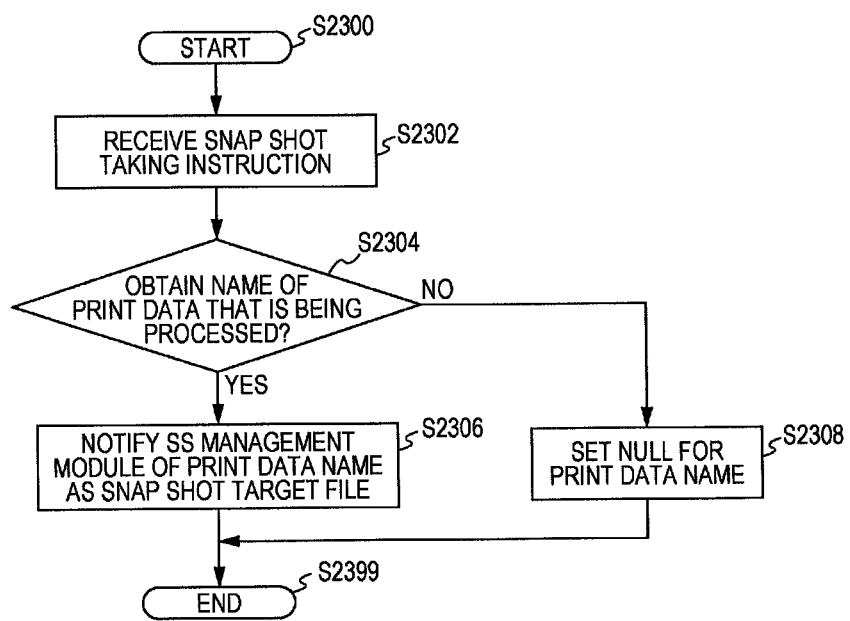
FIG. 23 is a flowchart illustrating a processing example according to the fifth exemplary embodiment.

FIG. 23 is a flowchart illustrating a processing example according to the fifth exemplary embodiment.

In step S2302, the SS control module 140 receives the snap shot taking instruction 2222.

In step S2304, the SS control module 140 determines whether or not the name of the print data that is being processed is obtained. When the name of the print data that is being processed is obtained, the process proceeds to step S2306. When the name of the print data that is being processed is not obtained, the process proceeds to step S2308.

In step S2306, the SS control module 140 notifies the SS management module 117 of the print data name as a snap shot target file.

In step 2308, the SS control module 140 sets NULL for the print data name.

Figure 24:
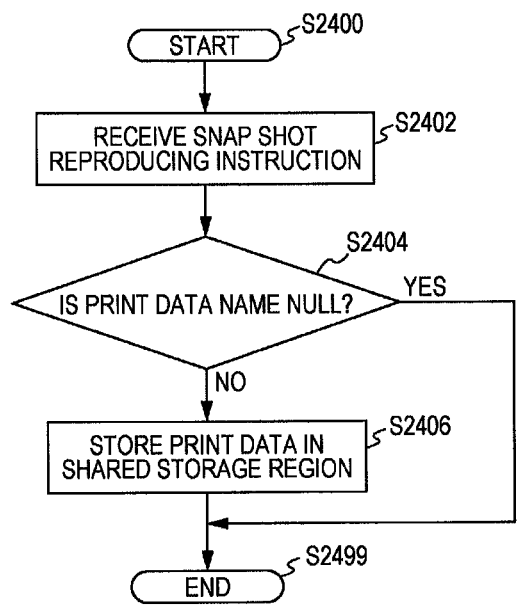
FIG. 24 is a flowchart illustrating a processing example according to the fifth exemplary embodiment.

FIG. 24 is a flowchart illustrating a processing example according to the fifth exemplary embodiment.

In step S2402, the SS management module 117 receives the snap shot reproducing instruction 2270.

In step S2404, the SS management module 117 determines whether or not the print data name is NULL. When the print data name is NULL, the process ends (step S2499). When the print data name is not NULL, the process proceeds to step S2406.

In step S2406, the SS management module 117 stores the print data in the shared storage region 1896.

An example of the hardware configuration of a computer according to an exemplary embodiment will be explained with reference to FIG. 29. The configuration illustrated in FIG. 29 includes, for example, a personal computer (PC), and is an example of a hardware configuration including a data reading unit 2917 such as a scanner and a data output unit 2918 such as a printer.

A CPU 2901 is a controller which performs processing in accordance with a computer program in which an execution sequence of the various modules explained in the foregoing exemplary embodiments, that is, individual modules such as the host OS 110, the virtualization SW 115, the guest OS 120, the print controller module 125, the output control module 130, the SS control module 140, and the failure information collecting module 135.

A read only memory (ROM) 2902 stores programs, arithmetic parameters, and the like to be used by the CPU 2901. A RAM 2903 stores programs to be used in the execution of the CPU 2901, parameters which vary appropriately in the execution of the CPU 2901, and the like. The CPU 2901, the ROM 2902, and the RAM 2903 are connected through a host bus 2904 which is, for example, a CPU bus.

A host bus 2904 is connected to an external bus 2906 such as a peripheral component interconnect/interface (PCI) bus through a bridge 2905.

A keyboard 2908 and a pointing device 2909 such as a mouse are input devices operated by an operator. A display 2910 may be a liquid crystal display or a cathode ray tube (CRT) and displays various types of information as text and image information.

A hard disk drive (HDD) 2911 contains a hard disk (may be a flash memory or the like). The HDD 2911 drives the hard disk and records or reproduces a program and information executed by the CPU 2901. A C-Log 127, an I-Log 182, print data 1894, and the like are stored in the hard disk. Furthermore, other various data, various computer programs, and the like are also stored in the hard disk.

A drive 2912 reads data or a program recorded in an installed removable recording medium 2913 such as a magnetic disk, an optical disc, a magneto-optical disk, or a semiconductor memory, and supplies the data or program to the RAM 2903 which is connected through an interface 2907, the external bus 2906, the bridge 2905, and the host bus 2904. The removable recording medium 2913 is also usable as a data recording region similar to a hard disk.

A connection port 2914 is a port to which an external connection device 2915 is connected, and includes a connection part such as a USB or IEEE 1394. The connection port 2914 is connected to the CPU 2901 and the like through the interface 2907, the external bus 2906, the bridge 2905, and the host bus 2904. A communication unit 2916 is connected to a communication line and executes processing for data communication with an external device. The data reading unit 2917 is, for example, a scanner, and executes document reading processing. The data output unit 2918 is, for example, a printer, and executes document data output processing.

Figure 29:
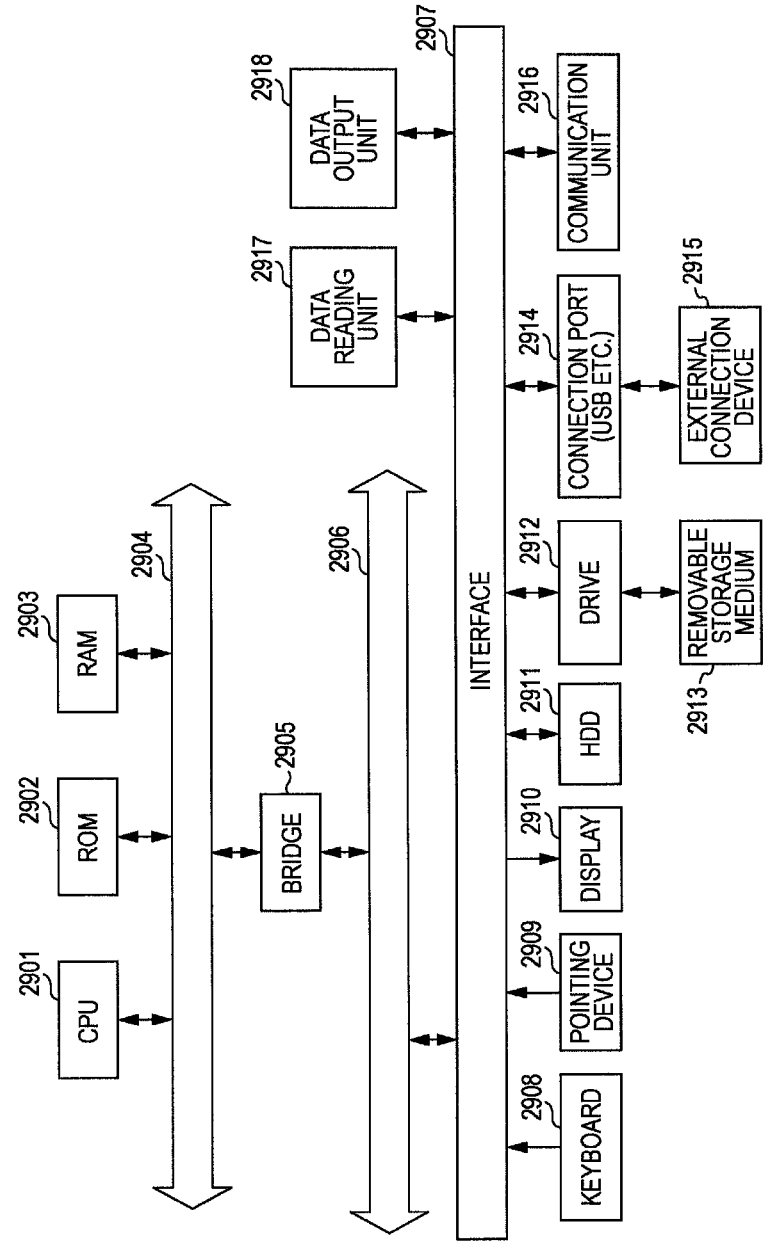
FIG. 29 is a block diagram illustrating an example of the hardware configuration of a computer which implements an exemplary embodiment.

The hardware configuration of the computer illustrated in FIG. 29 is a single configuration example. An exemplary embodiment is not limited to the configuration illustrated in FIG. 29 as long as the modules explained in the exemplary embodiments may be executed. For example, some modules may be configured to be dedicated hardware (for example, an application specific integrated circuit (ASIC)), some modules may be located in an external system that may be connected via a communication line, or plural systems illustrated in FIG. 29 may be connected to one another via a communication line so that they cooperate together. Furthermore, in particular, the modules may be incorporated in a portable information communication device (including a mobile phone, a smartphone, a mobile device, and a wearable computer), a home information appliance, a robot, a copying machine, a facsimile machine, a scanner, a printer, a multifunction machine (image processing device having two or more of functions of a scanner, a printer, a copying machine, a facsimile machine, and the like), or the like, as well as a personal computer.

The programs described above may be stored in a recording medium and provided or may be supplied through communication. In this case, for example, the program described above may be considered as an invention of "a computer-readable recording medium which records a program".

"A computer-readable recording medium which records a program" represents a computer-readable recording medium which records a program to be used for installation, execution, and distribution of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-Ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The program described above or part of the program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be part of another program or may be recorded in a recording medium along with a different program. Further, the program may be divided and recorded into multiple recording media. The program may be stored in any format, such as compression or encryption, as long as the program may be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A virtual computer system comprising:
   a physical printer controller configured to serve as:
      an external event acquisition controller that performs control for acquiring an event regarding an external device provided outside a virtual computer which mounts a guest operating system in which an application program is installed;
      an external event storing unit that stores the external event acquired by the external event acquisition controller; and
      a snap shot creating unit configured to create a snap shot in response to the external event storing unit storing the external event, the snap shot comprising
         first log information stored in the printer controller, the first log information including information of the guest operating system, and
         second log information stored in the external device, the second log information including information of the external event.

2. The virtual computer system according to claim 1, wherein the external event storing unit is provided within the virtual computer.

3. The virtual computer system according to claim 1, wherein the external event storing unit is provided within the external device.

4. The virtual computer system according to claim 1, wherein the external event storing unit is a storing unit within a computer which mounts a second virtual computer, which is different from the virtual computer, as a snap shot of the second virtual computer.

5. The virtual computer system according to claim 1, further comprising:
   a receiving unit that receives a notification indicating that storing of the event at the external event storing unit is completed,
   wherein the snap shot creating unit creates a snap shot after the notification is received by the receiving unit.

6. A method comprising:
   performing control, by a physical printer controller, for acquiring an event regarding an external device provided outside a virtual computer which mounts a guest operating system in which an application program is installed;

storing the acquired external event; and creating a snap shot in response to the external event storing unit storing the external event, wherein the snap shot comprises first log information stored in the printer controller, the first log information including information of the guest operating system, and second log information stored in the external device, the second log information including information of the external event.

7. A non-transitory computer readable medium storing a program causing a physical printer controller to execute a process comprising:

performing control for acquiring an event regarding an external device provided outside a virtual computer which mounts a guest operating system in which an application program is installed;

storing the acquired external event; and creating a snap shot in response to the external event storing unit storing the external event, wherein the snap shot comprises first log information stored in the printer controller, the first log information including information of the guest operating system, and second log information stored in the external device, the second log information including information of the external event.

\* \* \* \* \*